US012638134B2

(12) United States Patent
Han et al.

(10) Patent No.: US 12,638,134 B2
(45) Date of Patent: May 26, 2026

(54) BUNKERING VESSEL

(71) Applicant: HD HYUNDAI HEAVY INDUSTRIES CO., LTD., Ulsan (KR)

(72) Inventors: Jae Sig Han, Ulsan (KR); Ki Hyung Kwon, Ulsan (KR); Dong Jin Lee, Ulsan (KR); Bum Woo Han, Ulsan (KR); Jai Hyun Park, Ulsan (KR); Sang Ho Han, Ulsan (KR); Hyun Suk Kim, Ulsan (KR)

(73) Assignee: HD HYUNDAI HEAVY INDUSTRIES CO., LTD., Ulsan (KR)

( * ) Notice: Subject to any disclaimer, the term of this patent is extended or adjusted under 35 U.S.C. 154(b) by 0 days.

(21) Appl. No.: 18/778,176

(22) Filed: Jul. 19, 2024

(65) Prior Publication Data

US 2024/0369188 A1 Nov. 7, 2024

Related U.S. Application Data

(63) Continuation of application No. PCT/KR2022/001074, filed on Jan. 20, 2022.

(51) Int. Cl.
*F17C 5/02* (2006.01)
*B67D 9/00* (2010.01)
(Continued)

(52) U.S. Cl.
CPC .................. *F17C 5/02* (2013.01); *B67D 9/00* (2013.01); *F17C 1/002* (2013.01); *F17C 7/02* (2013.01);
(Continued)

(58) Field of Classification Search
CPC .... F17C 5/02; F17C 1/002; F17C 7/02; F17C 7/04; F17C 13/002; F17C 2221/014;
(Continued)

(56) References Cited

U.S. PATENT DOCUMENTS 3,374,639 A 3/1968 Burke et al.
5,201,184 A * 4/1993 Roth ......................... H01F 6/04
62/51.1
(Continued)

FOREIGN PATENT DOCUMENTS

GB 1184084 A 3/1970
JP H08295394 A 11/1996
(Continued)

OTHER PUBLICATIONS

KR 100967818 B1—English Translation (Year: 2010).*
(Continued)

*Primary Examiner* — Christopher M Afful
(74) *Attorney, Agent, or Firm* — IP & T GROUP LLP

(57) ABSTRACT

A bunkering vessel according to the present invention is for loading a liquefied gas to and unloading a liquefied gas from a liquefied gas storage tank of a target, and it includes a bunkering tank storing a liquefied gas; a manifold provided at a bunkering station of the bunkering vessel to flow in a liquefied gas to and flow out a liquefied gas from the bunkering vessel; a liquefied gas transfer line connecting the bunkering tank and the manifold to flow a liquefied gas; and a dry gas supply portion producing a dry gas, and the dry gas supply portion supplies a dry gas to the liquefied gas storage tank through the manifold before loading a liquefied gas to the liquefied gas storage tank to remove moisture inside the liquefied gas storage tank.

3 Claims, 17 Drawing Sheets

(51) Int. Cl.

| | |
|---|---|
| ***F17C 1/00*** | (2006.01) |
| ***F17C 7/02*** | (2006.01) |
| ***F17C 7/04*** | (2006.01) |
| ***F17C 13/00*** | (2006.01) |

(52) U.S. Cl.

CPC .............. *F17C 7/04* (2013.01); *F17C 13/002* (2013.01); *F17C 2221/014* (2013.01); *F17C 2223/0153* (2013.01); *F17C 2223/0161* (2013.01); *F17C 2225/0161* (2013.01); *F17C 2227/041* (2013.01); *F17C 2270/0105* (2013.01)

(58) Field of Classification Search

CPC ...... F17C 2223/0153; F17C 2223/0161; F17C 2225/0161; F17C 2227/041; F17C 2270/0105; B67D 9/00

USPC .......................................................... 141/311

See application file for complete search history.

(56) References Cited

U.S. PATENT DOCUMENTS

| | | | | |
|---|---|---|---|---|
| 8,490,565 | B1 * | 7/2013 | Shivers, III | B63B 27/30 114/230.17 |
| 11,698,169 | B2 | 7/2023 | Hodgson et al. | |
| 2007/0068176 | A1 | 3/2007 | Pozivil | |
| 2014/0090750 | A1 | 4/2014 | Liem et al. | |
| 2015/0000334 | A1 * | 1/2015 | Edwards | F25J 1/0278 62/611 |
| 2015/0330574 | A1 | 11/2015 | Fuchs et al. | |
| 2020/0277035 | A1 | 9/2020 | Fan et al. | |
| 2020/0386473 | A1 | 12/2020 | Becker et al. | |

FOREIGN PATENT DOCUMENTS

| | | | | |
|---|---|---|---|---|
| JP | 2019/500258 | A | 1/2019 | |
| JP | 2020-37360 | A | 3/2020 | |
| KR | 100967818 | B1 * | 7/2010 | B63B 25/16 |
| KR | 10-2012-0001371 | A | 1/2012 | |
| KR | 10-2015-0145329 | A | 12/2015 | |
| KR | 10-2016-0088183 | A | 7/2016 | |
| KR | 10-2016-0120180 | A | 10/2016 | |
| KR | 10-2016-0120182 | A | 10/2016 | |
| KR | 10-2016-0120213 | A | 10/2016 | |
| KR | 10-2016-0144876 | A | 12/2016 | |
| KR | 10-2016-0144886 | A | 12/2016 | |
| KR | 10-2016-0144888 | A | 12/2016 | |
| KR | 10-1844262 | B1 | 4/2018 | |
| KR | 10-2018-0127059 | A | 11/2018 | |
| KR | 20180127059 | A * | 11/2018 | F17C 6/00 |
| KR | 10-2019-0114456 | A | 10/2019 | |
| KR | 10-2019-0119641 | A | 10/2019 | |
| KR | 20190143681 | A * | 12/2019 | F23J 15/06 |
| KR | 10-2020-0002565 | A | 1/2020 | |
| KR | 10-2021-0038775 | A | 4/2021 | |
| KR | 10-2021-0045329 | A | 4/2021 | |
| KR | 10-2021-0045330 | A | 4/2021 | |
| KR | 10-2021-0045331 | A | 4/2021 | |
| KR | 10-2242746 | B1 | 4/2021 | |
| KR | 2021-0045328 | A | 4/2021 | |
| KR | 2021-0045331 | A | 4/2021 | |
| KR | 10-2275024 | B1 | 7/2021 | |
| KR | 10-2340143 | B1 | 12/2021 | |
| KR | 10-2022-0015730 | A | 2/2022 | |
| KR | 10-2022-0015733 | A | 2/2022 | |
| KR | 10-2022-0015735 | A | 2/2022 | |
| KR | 10-2022-0015736 | A | 2/2022 | |
| KR | 10-2022-0015743 | A | 2/2022 | |
| KR | 10-2022-0016409 | A | 2/2022 | |
| KR | 10-2022-0016412 | A | 2/2022 | |
| KR | 10-2022-0016413 | A | 2/2022 | |
| KR | 10-2022-0016415 | A | 2/2022 | |
| KR | 10-2022-0034284 | A | 3/2022 | |
| KR | 10-2022-0092344 | A | 7/2022 | |
| WO | 2014/136644 | A1 | 9/2014 | |
| WO | 2018185959 | A1 | 10/2018 | |
| WO | 2019/038364 | A2 | 2/2019 | |
| WO | 2020085329 | A1 | 4/2020 | |
| WO | 2023/140399 | A1 | 7/2023 | |

OTHER PUBLICATIONS

KR 20190143681 A—English Translation (Year: 2019).*

KR 20180127059 A—English translation (Year: 2018).*

L. R. Prew et al., "LNG Ship Cargo Systems-Some Design and Operating Considerations" , The Inst. of Marine Engineers-Transactions, vol. 88 (Jan. 1, 1976) pp. 92-102, XP001312169.

Extended European Search Report for the European Patent Application No. 24191080.1 issued by the European Patent Office on Dec. 16, 2024.

Extended European Search Report for the European Patent Application No. 24191088.4 issued by the European Patent Office on Dec. 16, 2024.

Extended European Search Report for the European Patent Application No. 24191105.6 issued by the European Patent Office on Mar. 3, 2025.

Kukdong Mes Container Specialist, About N2 Purge, Charge, and Dew Point, ISO Tank, Apr. 26, 2016, p. 1-10.

International Search Report for the International Application No. PCT/KR2022/001074 issued by the International Searching Authority (Korean Intellectual Property Office) on Nov. 10, 2022.

Office Action for the Japanese Patent Application No. 2024-543072 issued by the Japan Patent Office on Jun. 17, 2025.

Office Action for the U.S. Appl. No. 18/778,282 issued by the USPTO on Jul. 1, 2025.

Office Action for the U.S. Appl. No. 18/730,312 issued by the USPTO on Jul. 1, 2025.

Office Action for U.S. Appl. No. 18/730,309 issued by the USPTO on Mar. 24, 2026.

* cited by examiner

| | |
|---|---|
| — — — — | LIQUEFIED NATURAL GAS |
| - - - - - - - - | CONDENSATE |
| • • • • • • • • | LOW-TEMPERATURE NATURAL GAS |
| -·-·-·-·- | HIGH-TEMPERATURE NATURAL GAS |

BUNKERING VESSEL

CROSS-REFERENCE TO RELATED APPLICATION

This application is a Bypass Continuation of PCT/KR2022/001074 filed on Jan. 20, 2022. The disclosure of each of the foregoing applications is incorporated herein by reference in its entirety.

TECHNICAL FIELD

The present invention relates to a bunkering vessel.

BACKGROUND ART

Recently, as environmental regulations are strengthened, the use of liquefied natural gas (LNG), which is close to an eco-friendly fuel among various fuels, is increasing. Liquefied natural gas is generally transported through LNG carriers, and at this time, the LNG may be stored in a tank of an LNG carrier in a liquid state by lowering the temperature to −162° C. or less under 1 atm. When LNG becomes liquid, its volume is reduced to 1/600 compared to the gaseous state, so transport efficiency can be increased.

Unlike diesel, when LNG is loaded into or unloaded from a vessel that transports LNG or uses it as fuel, it must be maintained in a cryogenic state. In addition, while loading and unloading are carried out, it is necessary to control the temperature and pressure of the storage tank in which LNG is stored for stable storage of the LNG. Therefore, recently, continuous research and development has been conducted on a bunkering technology for maintaining LNG in a liquid state and supplying it to LNG carriers or LNG-powered vessels and on vessels using the same.

DISCLOSURE

Technical Problem

The present invention was created to solve the problems of the prior art as described above, and an object of the present invention is to provide a bunkering vessel capable of loading a liquefied gas to and unloading a liquefied gas from a liquefied gas storage tank of a target.

In addition, another object of the present invention is to provide a vessel capable of controlling the temperature and pressure conditions inside a target liquefied gas storage to satisfy conditions required in individual processes for loading a liquefied gas to and unloading a liquefied gas from a bunkering vessel.

Technical Solution

A bunkering vessel according to one aspect of the present invention is a bunkering vessel for loading a liquefied gas to and unloading a liquefied gas from a liquefied gas storage tank of a target, including a bunkering tank storing a liquefied gas; a manifold provided at a bunkering station of the bunkering vessel to flow in a liquefied gas to and flow out a liquefied gas from the bunkering vessel; a liquefied gas transfer line connecting the bunkering tank and the manifold to flow a liquefied gas; and a dry gas supply portion producing a dry gas, wherein before loading a liquefied gas to the liquefied gas storage tank, the dry gas supply portion supplies a dry gas to the liquefied gas storage tank through the manifold to remove moisture inside the liquefied gas storage tank, and wherein the liquefied gas transfer line includes a liquid phase transfer line transferring a liquefied gas of a liquid phase; and a gas phase transfer line transferring a liquefied gas of a gas phase, and wherein the bunkering vessel further includes a gas supply line delivering a dry gas received from the dry gas supply portion to at least one of the liquid phase transfer line and the gas phase transfer line, wherein the gas supply line may supply a dry gas through the liquid phase transfer line when an external temperature of the bunkering vessel is higher than or equal to a predetermined temperature, and supply a dry gas through the gas phase transfer line when an external temperature of the bunkering vessel is lower than a predetermined temperature.

A bunkering vessel according to another aspect of the present invention is a bunkering vessel for loading a liquefied gas to and unloading a liquefied gas from a liquefied gas storage tank of a target, including a bunkering tank storing a liquefied gas; a manifold provided at a bunkering station of the bunkering vessel to flow in a liquefied gas to and flow out a liquefied gas from the bunkering vessel; a liquefied gas transfer line connecting the bunkering tank and the manifold to flow a liquefied gas; and a dry gas supply portion producing a dry gas, wherein before loading a liquefied gas to the liquefied gas storage tank, the dry gas supply portion supplies a dry gas to the liquefied gas storage tank through the manifold to remove moisture inside the liquefied gas storage tank, and wherein the liquefied gas transfer line includes a liquid phase transfer line transferring a liquefied gas of a liquid phase; and a gas phase transfer line transferring a liquefied gas of a gas phase, and wherein the bunkering vessel further includes a gas supply line delivering a dry gas received from the dry gas supply portion to at least one of the liquid phase transfer line and the gas phase transfer line, wherein the gas supply line may supply a dry gas through the liquid phase transfer line when an internal temperature of the liquefied gas storage tank is higher than or equal to a predetermined temperature, and supply a dry gas through the gas phase transfer line when an internal temperature of the liquefied gas storage tank is lower than a predetermined temperature.

A bunkering vessel according to still another aspect of the present invention is a bunkering vessel for loading a liquefied gas to and unloading a liquefied gas from a liquefied gas storage tank of a target, including a bunkering tank storing a liquefied gas; a manifold provided at a bunkering station of the bunkering vessel to flow in a liquefied gas to and flow out a liquefied gas from the bunkering vessel; a liquefied gas transfer line connecting the bunkering tank and the manifold to flow a liquefied gas; and an inert gas supply portion producing an inert gas, wherein before loading a liquefied gas to the liquefied gas storage tank, the inert gas supply portion supplies an inert gas to the liquefied gas storage tank through the manifold to remove oxygen inside the liquefied gas storage tank, and wherein the liquefied gas transfer line includes a liquid phase transfer line transferring a liquefied gas of a liquid phase; and a gas phase transfer line transferring a liquefied gas of a gas phase, wherein the bunkering vessel further includes a gas supply line delivering an inert gas received from the inert gas supply portion to at least one of the liquid phase transfer line and the gas phase transfer line, wherein the inert gas is a gas generated by combusting nitrogen gas or heavy oil, and the gas supply line may supply an inert gas through the liquid phase transfer line when the inert gas is nitrogen gas, and supply an inert gas through the gas phase transfer line when the inert gas is a gas generated by combusting heavy oil.

A bunkering vessel according to yet another aspect of the present invention is a bunkering vessel for loading a liquefied gas to and unloading a liquefied gas from a liquefied gas carrier provided with a liquefied gas vaporizer, include a bunkering tank storing a liquefied gas; a manifold provided at a bunkering station of the bunkering vessel to flow in a liquefied gas to and flow out a liquefied gas from the bunkering vessel; and a liquefied gas transfer line connecting the bunkering tank and the manifold to flow a liquefied gas, wherein before loading a liquefied gas to the liquefied gas carrier, a liquefied gas of a relatively small flow rate compared to a flow rate of a liquefied gas upon the loading is supplied to a liquefied gas storage tank provided at the liquefied gas carrier through the manifold, and a discharge gas is received from the liquefied gas carrier, and wherein the liquefied gas transfer line includes a liquid phase transfer line transferring a liquefied gas of a liquid phase; and a gas phase transfer line transferring a liquefied gas of a gas phase, and wherein the bunkering vessel supplies a liquefied gas to the liquefied gas vaporizer through the liquid phase transfer line, and wherein the discharge gas is a gas that has been stored in the liquefied gas storage tank and that is discharged as a liquefied gas vaporized in the liquefied gas vaporizer is injected to the liquified gas storage tank, and wherein the bunkering vessel receives the discharge gas through the gas phase transfer line, wherein the gas phase transfer line may supply the discharge gas to at least one of a gas combustion unit and a venting portion when a concentration of an inert gas included in the discharge gas is higher than or equal to a predetermined value, and supply the discharge gas to at least one of a gas combustion unit and a buffer tank when a concentration of an inert gas included in the discharge gas is lower than a predetermined value.

A bunkering vessel according to yet another aspect of the present invention is a bunkering vessel for loading a liquefied gas to and unloading a liquefied gas from a liquefied gas storage tank of a target, including a bunkering tank storing a liquefied gas; a manifold provided at a bunkering station of the bunkering vessel to flow in a liquefied gas to and flow out a liquefied gas from the bunkering vessel; a liquefied gas transfer line connecting the bunkering tank and the manifold to flow a liquefied gas; and a liquefied gas vaporizer, wherein before loading a liquefied gas to the liquefied gas tank, a liquefied gas vaporized at the liquefied gas vaporizer is supplied to the liquefied gas storage tank through the manifold, and a discharge gas is received from the target, and wherein the liquefied gas transfer line includes a liquid phase transfer line transferring a liquefied gas of a liquid phase; and a gas phase transfer line transferring a liquefied gas of a gas phase, and wherein the liquefied gas vaporizer receives a liquefied gas from the bunkering tank, vaporizes the same, and then supplies the same to the gas phase transfer line, and wherein the discharge gas is a gas that has been stored in the liquefied gas storage tank and that is discharged as a liquefied gas vaporized in the liquefied gas vaporizer is injected to the liquified gas storage tank, and wherein the bunkering vessel receives the discharge gas through the gas phase transfer line, wherein the gas phase transfer line may supply the discharge gas to at least one of a gas combustion unit and a venting portion when a concentration of an inert gas included in the discharge gas is higher than or equal to a predetermined value, and supply the discharge gas to at least one of a gas combustion unit and a buffer tank when a concentration of an inert gas included in the discharge gas is lower than a predetermined value.

A bunkering vessel according to yet another aspect of the present invention is a bunkering vessel for loading a liquefied gas to and unloading a liquefied gas from a liquefied gas storage tank of a target, including a bunkering tank storing a liquefied gas; a manifold provided at a bunkering station of the bunkering vessel to flow in a liquefied gas to and flow out a liquefied gas from the bunkering vessel; and a liquefied gas transfer line connecting the bunkering tank and the manifold to flow a liquefied gas, wherein after unloading a liquefied gas from the liquefied gas storage tank, a liquefied gas is supplied to the liquefied gas storage tank through the manifold, and a discharge gas is received from the target, wherein the discharge gas is a liquified gas remaining in the liquefied gas storage tank, and wherein the bunkering vessel further includes a liquefied gas vaporizer vaporizing a liquefied gas received from the bunkering tank, wherein after unloading a liquefied gas is unloaded from the liquefied gas storage tank, a liquefied gas in a gaseous state is supplied to the liquefied gas storage tank, and wherein the liquefied gas transfer line includes a liquid phase transfer line transferring a liquefied gas of a liquid phase; and a gas phase transfer line transferring a liquefied gas of a gas phase, and wherein immediately after unloading a liquefied gas from the liquefied gas storage tank, the bunkering vessel may supply a liquefied gas to the liquefied gas storage tank through the liquid phase transfer line, receive a discharge gas through the gas phase transfer line, supply a discharge gas through the gas phase transfer line, and receive a discharge gas through the liquid phase transfer line when an internal temperature of the liquefied gas storage tank becomes higher than a predetermined temperature.

A bunkering vessel according to yet another aspect of the present invention is a bunkering vessel for loading a liquefied gas to and unloading a liquefied gas from a liquefied gas storage tank of a target, including a bunkering tank storing a liquefied gas; a manifold provided at a bunkering station of the bunkering vessel to flow in a liquefied gas to and flow out a liquefied gas from the bunkering vessel; and a liquefied gas transfer line connecting the bunkering tank and the manifold to flow a liquefied gas, wherein after unloading a liquefied gas from the liquefied gas storage tank, a liquefied gas is supplied to the liquefied gas storage tank through the manifold, and a discharge gas is received from the target, wherein the discharge gas is a liquified gas remaining in the liquefied gas storage tank, and wherein the bunkering vessel further includes a liquefied gas vaporizer vaporizing a liquefied gas received from the bunkering tank, wherein after unloading a liquefied gas is unloaded from the liquefied gas storage tank, a liquefied gas in a gaseous state is supplied to the liquefied gas storage tank, and wherein the liquefied gas transfer line includes a liquid phase transfer line transferring a liquefied gas of a liquid phase; and a gas phase transfer line transferring a liquefied gas of a gas phase, and wherein the liquified gas transfer line supplies a discharge gas to a buffer tank, wherein the buffer tank may supply a liquid phase liquefied gas to the bunkering tank.

A bunkering vessel according to yet another aspect of the present invention is a bunkering vessel for loading a liquefied gas to and unloading a liquefied gas from a liquefied gas storage tank of a target, including a bunkering tank storing a liquefied gas; a manifold provided at a bunkering station of the bunkering vessel to flow in a liquefied gas to and flow out a liquefied gas from the bunkering vessel; a liquefied gas transfer line connecting the bunkering tank and the manifold to flow a liquefied gas; an inert gas supply portion producing an inert gas, wherein after unloading a liquefied gas from the liquefied gas storage tank, the inert gas supply portion supplies an inert gas to the liquefied gas storage tank through the manifold and receives a discharge gas from the target, and wherein the liquefied gas transfer line includes a liquid phase transfer line transferring a liquefied gas of a liquid phase; and a gas phase transfer line transferring a liquefied gas of a gas phase, and wherein the bunkering vessel supplies an inert gas to the liquefied gas storage tank through the liquid phase transfer line and receives a discharge gas through the gas phase transfer line, wherein the gas phase transfer line supplies a discharge gas to at least one of a gas combustion unit, a venting portion, and a buffer tank, wherein the discharge gas includes a liquefied gas, and wherein the buffer tank may supply a liquid phase liquefied gas to the bunkering tank.

A bunkering vessel according to yet another aspect of the present invention is a bunkering vessel for loading a liquefied gas to and unloading a liquefied gas from a liquefied gas storage tank of a target, including a bunkering tank storing a liquefied gas; a manifold provided at a bunkering station of the bunkering vessel to flow in a liquefied gas to and flow out a liquefied gas from the bunkering vessel; a liquefied gas transfer line connecting the bunkering tank and the manifold to flow a liquefied gas; and a dry gas supply portion producing a dry gas, wherein after unloading a liquefied gas from the liquefied gas storage tank, the dry gas supply portion supplies a dry gas to the liquefied gas storage tank through the manifold to discharge an inert gas from the liquefied gas storage tank, and wherein the liquefied gas transfer line includes a liquid phase transfer line transferring a liquefied gas of a liquid phase; and a gas phase transfer line transferring a liquefied gas of a gas phase, and wherein the bunkering vessel further includes a gas supply line delivering a dry gas received from the dry gas supply portion to at least one of the liquid phase transfer line and the gas phase transfer line, the gas supply line may supply a dry gas through the liquid phase transfer line when the inert gas is nitrogen gas, and supply a dry gas through the gas phase transfer line when the inert gas is a gas generated by combusting heavy oil.

A bunkering vessel according to yet another aspect of the present invention is a bunkering vessel for loading a liquefied gas to and unloading a liquefied gas from a target liquefied gas storage tank, including: a bunkering tank storing a liquefied gas; a manifold provided at a bunkering station of the bunkering vessel to flow in a liquefied gas to and flow out a liquefied gas from the bunkering vessel; a liquefied gas transfer line connecting the bunkering tank and the manifold to flow a liquefied gas; a generator engine producing power by using a liquefied gas as fuel; and a liquefied gas supply line branched from the liquefied gas transfer line and supplying a liquefied gas from the bunkering tank to the generator engine, wherein the liquefied gas supply line supplies a boil-off gas generated in the bunkering tank to the generator engine, and wherein the liquefied gas transfer line includes a liquid phase transfer line transferring a liquefied gas of a liquid phase; and a gas phase transfer line transferring a liquefied gas of a gas phase, wherein the liquid phase transfer line supplies a liquefied gas of a liquid phase to the liquefied gas storage tank through the manifold, and the gas phase transfer line receives a boil-off gas generated from the liquefied gas storage tank, and wherein the bunkering vessel further includes a second liquefied gas supply line branched from the liquid phase transfer line and supplying a liquefied gas of a liquid phase to the liquefied gas supply line, wherein the second liquefied gas supply line may be provided with a forced vaporizer vaporizing a liquefied gas of a liquid phase.

A bunkering vessel according to yet another aspect of the present invention is a bunkering vessel for loading a liquefied gas to and unloading a liquefied gas from a target liquefied gas storage tank, including: a bunkering tank storing a liquefied gas; a manifold provided at a bunkering station of the bunkering vessel to flow in a liquefied gas to and flow out a liquefied gas from the bunkering vessel; a liquefied gas transfer line connecting the bunkering tank and the manifold to flow a liquefied gas; a generator engine producing power by using a liquefied gas as fuel; and a liquefied gas supply line branched from the liquefied gas transfer line and supplying a liquefied gas from the bunkering tank to the generator engine, wherein the liquefied gas supply line supplies a boil-off gas generated in the bunkering tank to the generator engine, and wherein the liquefied gas transfer line further includes a gas-liquid separator separating a liquefied gas into a gas phase and a liquid phase and returning a liquefied gas of a liquid phase to the bunkering tank; and a buffer tank provided with a low-duty (LD) compressor receiving a liquefied gas of a gas phase from the gas-liquid separator and pressurizing to a pressure required by the generator engine and storing a discharge gas received from the target in a process of loading a liquefied gas to the target, wherein the discharge gas is a gas stored in the liquefied gas storage tank and discharged and may include a liquefied gas.

A bunkering vessel according to yet another aspect of the present invention is a bunkering vessel for loading a liquefied gas to and unloading a liquefied gas from a target liquefied gas storage tank, including: a bunkering tank storing a liquefied gas; a manifold provided at a bunkering station of the bunkering vessel to flow in a liquefied gas to and flow out a liquefied gas from the bunkering vessel; a liquefied gas transfer line connecting the bunkering tank and the manifold to flow a liquefied gas; and a liquefied gas supply line branched from the liquefied gas transfer line and supplying a liquefied gas from the bunkering tank to a gas combustion unit, wherein the gas combustion unit processes a boil-off gas generated in the bunkering tank by combusting the same, and wherein the liquefied gas supply line is provided with a compressor pressurizing a liquefied gas to a pressured required by the gas combustion unit and supplying the same, and wherein the bunkering vessel may further include a buffer tank storing at least a part of a pressured liquefied gas.

Advantageous Effects

A bunkering vessel according to the present invention is capable of loading a cryogenic liquefied gas to and unloading a cryogenic liquefied gas from a liquefied gas storage tank of a target, and is capable of controlling the temperature and pressure in the liquefied gas storage tank to conditions required by an individual process for loading and unloading.

In addition, the bunkering vessel according to the present invention can minimize unwanted vaporization of a liquefied gas in loading and unloading processes of a liquefied gas.

In addition, the bunkering vessel according to the present invention can processes a discharge gas generated in loading and unloading processes at a liquefied gas storage tank of a target.

In addition, the bunkering vessel according to the present invention can independently process a boil-off gas generated in a bunkering tank.

MODES OF THE INVENTION

Figure 1:
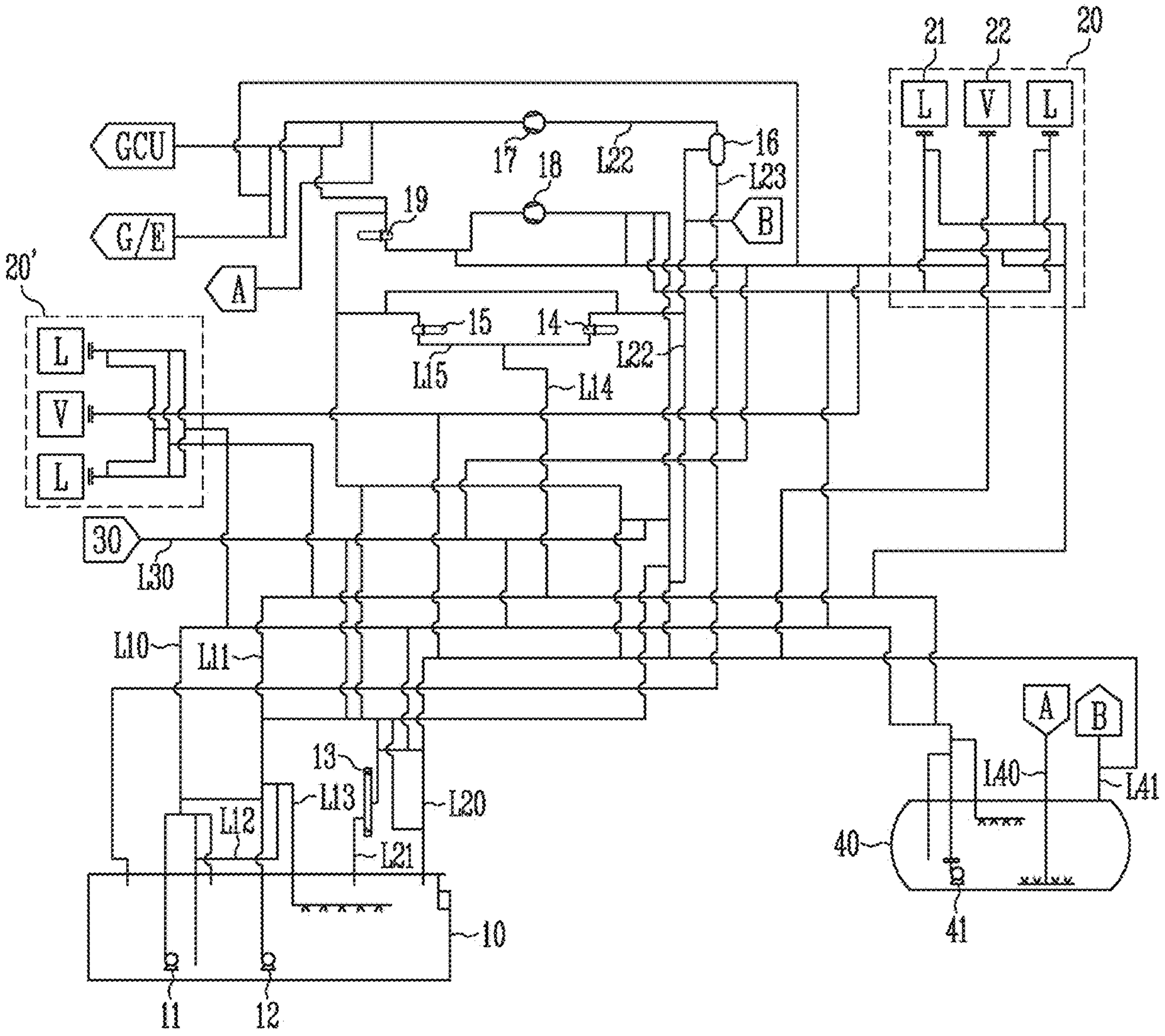
FIG. 1 is a conceptual diagram of a bunkering system a bunkering vessel according to an embodiment of the present invention.

The objects, specific advantages, and novel features of the present invention will become more apparent from the following detailed description and preferred embodiments taken in conjunction with the accompanying drawings. In the present specification, when adding reference numbers to components in each drawing, it should be noted that identical components are given the same number as much as possible even if they are shown in different drawings. In addition, in describing the present invention, when it is determined that a detailed description of related known technologies may unnecessarily obscure the gist of the present invention, the detailed description will be omitted.

Hereinafter, it is to be noted that, high pressure (HP), low pressure (LP), high temperature, and low temperature are relative, do not represent absolute values, and may be used relatively according to each embodiment of the present invention.

Hereinafter, a bunkering vessel refers to a vessel capable of loading a liquefied gas to and unloading a liquefied gas from a liquefied gas storage tank of a target and using a stored liquefied gas as fuel.

Hereinafter, it is to be noted that the term 'target' is used to encompass all offshore plants such as floating, storage, re-gasification unit (FSRU) and floating production, storage, and offloading (FPSO) in addition to liquefied gas carriers that transport a liquefied gas as cargo and liquefied gas propulsion vessels that can use a liquefied gas as fuel. In addition, a 'target' may encompass other bunkering vessels and liquefied gas transport vehicles having a liquefied gas storage tank. However, in a specific embodiment of the present invention, a target may be limited to one or more of the above.

Hereinafter, when a target is a liquefied gas carrier, a bunkering vessel according to the present invention may be provided to perform the processes below for trial operation of the liquefied gas carrier.

Hereinafter, the term 'liquefied gas' may be used to encompass all gas fuels that are generally stored in a low-temperature liquid state, such as LNG, LPG, ethylene, and ammonia. However, in the following embodiments and drawings, examples in which a liquefied gas is a liquefied natural gas will be described.

Hereinafter, a boil-off gas (BOG) may refer to a spontaneously vaporized or forcibly vaporized liquefied gas. However, the term 'BOG' may be used to include not only a BOG of a gaseous state but also a liquefied BOG. In addition, it is to be noted that hereinafter, a liquefied gas may be used as a term encompassing both a liquid state and a spontaneously vaporized or forcibly vaporized gas state.

Hereinafter, bunkering encompasses loading, which is supplying a liquefied gas from a bunkering vessel to a target, and unloading, which is withdrawing a liquefied gas from a target so that a bunkering vessel receives the same.

Hereinafter, a bunkering vessel connected to a target means a state in which a manifold and a pipe are connected so that a liquefied gas, a BOG, or other gas may communicate between the bunkering vessel and the target.

Hereinafter, expressions such as first, second, and the like are intended in the present invention to refer to a plurality of specific features provided, and each expression may refer to any one of the plurality of features.

Hereinafter, preferred embodiments of the present invention will be described in detail with reference to the attached drawings.

FIG. 1 is a conceptual diagram of a bunkering system a bunkering system as an internal system of a bunkering vessel according to an embodiment of the present invention.

Referring to FIG. 1, a bunkering vessel includes a bunkering tank 10, a manifold 20, a liquefied gas transfer line, a gas supply portion 30, a buffer tank 40, and the like.

Although not shown below, each line may be provided with a valve for controlling a flow rate of a fluid flowing through the line.

A bunkering tank 10 may be a storage tank mounted inside a bunkering vessel to store a liquefied gas for loading a liquefied gas to and unloading a liquefied gas from a liquefied gas storage tank of a target. The bunkering tank 10 may be a membrane tank with a membrane-type insulation structure suitable for storing a cryogenic liquefied gas. A plurality of bunkering tanks 10 may be provided inside a bunkering vessel. For example, bunkering tanks 10 may be provided side by side along a bow and a stern of a vessel, or may be provided side by side on a portside and a starboard of a vessel, respectively.

A bunkering tank 10 may be connected to a manifold 20, which will be described later, and may supply a liquefied gas stored therein to a target through the manifold 20 or receive a liquefied gas from the target. Specifically, a liquefied gas transfer line, one end of which is connected to a bunkering tank 10, and the other end of which is connected to a manifold 20, may be provided so that a liquefied gas may flow. A liquefied gas transfer line may include a liquid phase transfer line L10, a gas phase transfer line L20, and a spray line L11.

Hereinafter, a liquid phase transfer line L10 and a gas phase transfer line L20 refer to lines for communicating a liquefied gas of a liquid phase and a liquefied gas of a gas phase, respectively, based on a loading process of supplying a liquefied gas from a bunkering vessel to a liquefied gas storage tank of a target. A spray line L11 may refer to a line for communicating a liquefied gas of a liquid phase, but a flow rate of a liquefied gas communicating therethrough may be lower than that of a liquid phase transfer line L10. Hereinafter, a liquid phase transfer line L10 may refer to both a liquid phase transfer line L10 and a spray line L11, and may refer to at least one of a liquid phase transfer line L10 and a spray line L11. However, these transfer lines are not necessarily intended to communicate only a liquefied gas of a liquid phase of a gas phase, and as described later, they may communicate a liquefied gas in other states or a dry gas or an inert gas other than a liquefied gas.

A bunkering tank 10 may be provided with a first pump 11 and a second pump 12. Although not shown, a first pump 11 may be provided at the bottom of a pump tower and may be installed to be submerged in a liquefied gas. A first pump 11 may be installed to be spaced apart from a floor inside a bunkering tank 10. A liquefied gas withdrawn by a first pump 11 may be supplied to a manifold 20, which will be described later, through a liquefied gas transfer line. Specifically, a liquefied gas withdrawn by a first pump 11 may be supplied to a manifold 20 through a liquid phase transfer line L10. A liquid phase transfer line L10 may be provided with a return line (not shown) that may return a withdrawn liquefied gas back to a bunkering tank 10.

A second pump 12 is provided inside a bunkering tank 10 and may be disposed at a relatively lower position than a first pump 11. A first pump 11 is intended to handle a relatively higher flow rate than a second pump 12, and may be used for loading and unloading of a liquefied gas. A second pump 12 is for further pumping a trace amount of liquefied gas remaining inside a bunkering tank 10 after loading and unloading processes, and may pump a liquefied gas positioned at a height that a first pump 11 is unable to handle. In addition, a second pump 12 may be used to transfer a liquefied gas from a bunkering tank 10 when a bunkering vessel supports a gassing-up process or cooling-down process of a target vessel.

For example, a second pump 12 may be disposed inside a sump (not shown) formed on a floor of a bunkering tank 10. A sump is provided in the shape of a puddle on a floor of a bunkering tank 10, and may be provided such that a small amount of liquefied gas accumulates in the sump after most of the liquefied gas is withdrawn from the bunkering tank 10. A second pump 12 may withdraw a liquefied gas accumulated in the sump.

A liquefied gas withdrawn by a second pump 12 may be supplied to a manifold 20 through a spray line L11. In addition, a spray line L11 may be connected to a liquid phase transfer line L10 to transfer a withdrawn liquefied gas to the liquid phase transfer line L10. In addition, a spray line L11 may be provided with a liquefied gas return line L12 connected to a return line branched from a liquid phase transfer line L10. By controlling a flow rate of a liquefied gas flowing into a liquefied gas return line L12, a flow rate of a liquefied gas supplied to a liquid phase transfer line L10 through may be controlled. In addition, a spray line L11 may be provided with a spray return line L13. A spray return line L13 may return at least a part of a liquefied gas flowing through a spray line L11 to the inside of a bunkering tank 10, and it may be provided at the top of the inside of the bunkering tank 10 to spray and return a liquefied gas. A spray return line L13 may spray at least a part of the liquefied gas to a BOG generated inside a bunkering tank 10 to lower the temperature inside the bunkering tank 10.

A gas phase transfer line L20 and a vent line L21 may be provided at the top of a bunkering tank 10. A BOG of a liquefied gas generated inside a bunkering tank 10 may be supplied to a manifold 20 through a gas phase transfer line L20. In addition, a BOG of a liquefied gas generated inside a bunkering tank 10 may be supplied to a vent portion 13, which will be described later, through a vent line L21. A gas phase transfer line L20 may supply a part of a withdrawn BOG to a vent portion 13. A vent portion 13 may receive a liquefied gas or a dry gas or an inert gas, which will be described later, and discharge it to the outside of a bunkering vessel. When the pressure inside a bunkering tank 10 is higher than or equal to a predetermined level, a bunkering vessel may discharge at least a part of a BOG by supplying it to a vent portion 13 through a gas phase transfer line L20.

A manifold 20 is provided at a bunkering station of a bunkering vessel and connected to a liquefied gas transfer line to allow a liquefied gas to flow in and out of the bunkering vessel. A bunkering station provides a point of connection to an object of loading and unloading through a pipe (not shown). A liquefied gas transfer line may be connected to a manifold 20. A manifold 20 may be provided with a liquid phase manifold 21, one end of which is connected to a liquid phase transfer line L10, and a gas phase manifold 22, one end of which is connected to a gas phase transfer line L20. That is, one end of a spray line L11 may also be connected to a liquid phase manifold 21. The other end of each manifold may communicate with a target through a separately provided pipe. The pipe, which is provided at a loading arm (not shown), is suitable for communicating a cryogenic liquefied gas, and may be provided with a cryogenic adapter, a cryogenic coupler or the like to be connected to a manifold 20.

Although not shown, the bunkering station may be provided with an emergency shut-down (ESD) system connected to a manifold 20, and may be provided with a sensor for monitoring the temperature, pressure, flow rate, and the like of a liquefied gas communicating through the manifold 20 and with a sensor for controlling a flow rate of a liquefied gas. A bunkering station may be provided on the top of a bunkering tank 10 within a bunkering vessel. For example, a bunkering station may be disposed above or below an upper deck, and a bunkering tank 10 may be disposed between the bottom of a bunkering vessel and a bunkering station.

A manifold 20 may each be provided with a plurality of liquid phase manifolds 21 and gas phase manifolds 22. A plurality of individual manifolds may be disposed side by side at a bunkering station. For example, as manifolds 20, two liquid phase manifolds 21 and one gas phase manifold 22 may be provided, and one gas phase manifold 22 may be disposed between two liquid phase manifolds 21.

A plurality of manifolds 20 may be provided on a bunkering vessel. For example, a bunkering vessel may include one manifold 20 on a portside or starboard thereof, and another manifold 20' at a stern thereof. A manifold 20 may be provided on one side of a bunkering vessel to be connected to a liquefied gas carrier, a propulsion ship, a platform or the like, and the other manifold 20' disposed at a stern may provide a structure suitable for connection to another bunkering vessel. Each manifold may have the same configuration, but it is not limited to thereto. When a bunkering vessel has a plurality of manifolds 20 and 20', a liquid phase transfer line L10 may be connected to a liquid phase manifold 21 of each manifold 20 and 20', and a gas phase transfer line L20 may be connected to a gas phase manifold 22 of each manifold 20 and 20'. It will be understood that a spray line L11 may also be connected to a liquid phase manifold 21 of each manifold 20 and 20'. That is, one end of a liquefied gas transfer line may be connected to a bunkering tank 10, and the other end may be branched and connected to each of manifold 20 and 20'.

As described above, a liquefied gas transfer line may be provided with a liquid phase transfer line L10 and a gas phase transfer line L20 based on a loading process in which a liquefied gas is received from a bunkering vessel to a target, and it may further include a spray line L11. One end of a spray line L11 may be connected to a liquid phase transfer line L10 to deliver a liquefied gas of a liquid phase, or may be directly connected to a manifold 20 and 20' to deliver a liquefied gas. At this time, the spray line L11 may transport liquefied gas at a lower flow rate than the liquid phase transfer line L10.

A liquefied gas transfer line may be connected to a liquefied gas supply line L14 and L22. Specifically, a liquefied gas supply line L22 may be branched off from a gas phase transfer line L20 and supply a liquefied gas of a gas phase to at least one of a gas combustion unit (GCU), a generator engine (G/E), and a buffer tank 40, which will be described later. A GCU may combust and treat a liquefied gas and then discharge it to the outside of a bunkering vessel. A G/E may produce power using a liquefied gas as fuel. Preferably, a G/E may use a liquefied gas of a gas phase as fuel. A buffer tank 40 may temporarily store a liquefied gas and supply it to a place where it is needed, and may temporarily store a liquefied gas of a gas phase. A buffer tank 40 may withdraw a received liquefied gas separately as a liquid phase and a gas phase.

In addition, a liquefied gas supply line L14 may be branched off from at least one of a liquid phase transfer line L10 and a spray line L11 to vaporize a liquefied gas of a liquid phase and then transfer it to a liquefied gas supply line L22. A liquefied gas supply line L14 may be provided with a forced vaporizer 14 to vaporize a liquefied gas of a liquid phase and deliver it to a liquefied gas supply line L22.

A liquefied gas supply line L22 may receive a liquefied gas of a gas phase from a liquefied gas transfer line and then branches it off to supply it to at least one receiver among a GCU, a G/E, and a buffer tank 40. Specifically, gas temperature and pressure conditions required by a GCU, a G/E, and a buffer tank 40 may be different. A plurality of liquefied gas supply lines L22 may be provided in parallel, and any one liquefied gas supply line L22 may be provided with a low-duty (LD) compressor 17, and the other liquefied gas supply line L22 may be provided with a high-duty (HD) compressor 18. A liquefied gas supply line L22 may supply to a receiver through any one of the above compressors depending on the type of receiver and conditions required thereby.

A liquefied gas supply line L22 may further be provided with a gas-liquid separator 16. A gas-liquid separator 16 separates a liquefied gas received from a liquefied gas transfer line into a gas phase and a liquid phase, and a liquefied gas of only a gas phase may be supplied to at least one of a GCU, a G/E, and a buffer tank 40 through a liquefied gas supply line L22. A liquid phase separated in a gas-liquid separator 16 is a condensate formed by condensing at least a part of a liquefied gas of a gas phase, and may be returned to a bunkering tank 10 through a condensate return line L23. Preferably, a gas-liquid separator 16 may be provided at a front end of an LD compressor 17.

A liquefied gas supply line L22 may further be provided with a heater 19. A heater 19 may further heat a liquefied gas supplied through a liquefied gas supply line L22 and supply it to at least one of a GCU, a G/E, and a buffer tank 40. When a liquefied gas is pressurized in a compressor 17 and 18, its temperature increases, but the increased temperature may be lower than the temperature required by the above-mentioned receivers. A heater 19 may further heat the liquefied gas and adjust it to the temperature level required by a receiver. Preferably, a heater 19 may be provided at a rear end of an HD compressor 18.

For example, with reference to the drawings, a liquefied gas supply line L22 may be provided to be branched off from a gas phase transfer line L20 and then be further branched into a plurality of liquefied gas supply lines L22. Any one liquefied gas supply line L22 may be provided with a gas-liquid separator 16 and an LD compressor 17, and may transfer a liquefied gas of a gas phase to be supplied to at least one of a GCU, a G/E, and a buffer tank 40. At this time, a liquefied gas supply line L14 may join at a front end of the gas-liquid separator 16 to receive the liquefied gas of a gas phase and supply it to the gas-liquid separator 16. The other liquefied gas supply line L22 may be provided with an HD compressor 18 and a heater 19, and may transfer a heated liquefied gas of a gas phase to be supplied to at least one of a GCU, a G/E, and a buffer tank 40.

A bunkering vessel may include a gas supply portion 30. A gas supply portion 30 may supply a gas to a liquefied gas storage tank of a target through a manifold 20. A gas in a gas supply portion 30 may be at least one of a dry gas and an inert gas, and a gas supply portion 30 may produce at least one of a dry gas and an inert gas and supply it to a target.

A gas supply line L30 may have one end connected to a gas supply portion 30 and the other end connected to a liquefied gas transfer line to communicate a gas. A gas supply line L30 may be connected to at least one of a liquid phase transfer line L10, a gas phase transfer line L20, and a spray line L11 to transfer a gas received from a gas supply portion 30. Preferably, a gas supply line L30 may be connected to at least one of a liquid phase transfer line L10 and the gas phase transfer line L20. A gas produced in a gas supply portion 30 may be delivered to a manifold 20 through a gas supply line L30 and a liquefied gas transfer line, and may be supplied to a liquefied gas storage tank of a target through the manifold 20.

A bunkering vessel may include a buffer tank 40. A buffer tank 40 is provided separately from a bunkering tank 10 and may be used in loading and unloading processes using a bunkering vessel. A buffer tank 40 may be provided in the form of a pressure container to store contents at a relatively high pressure compared to a bunkering tank 10.

A buffer tank 40A may be provided with a pump 41. A pump 41 may be provided inside a buffer tank 40 and installed to withdraw a liquefied gas. A liquefied gas withdrawn by a pump 41 may be supplied to a liquefied gas transfer line. For example, a liquefied gas of a liquid phase withdrawn from a buffer tank 40 may be supplied to at least one of a bunkering tank 10 and a manifold 20 through a liquid phase transfer line L10. At this time, at least a part of the withdrawn liquefied gas may be returned by spraying it into the buffer tank 40, similar to a spray return line L13.

In addition, a buffer tank 40 may be provided with a buffer tank supply line L40. A buffer tank supply line L40 may have one end connected to a liquefied gas supply line L22 and the other end connected to the inside of a buffer tank 40, so that a liquefied gas received from the liquefied gas supply line L22 is delivered to the buffer tank 40. A buffer tank supply line L40 may be installed to supply a liquefied gas from the bottom of a buffer tank 40. When a liquefied gas of a liquid phase is present inside a buffer tank 40, a liquefied gas delivered through a buffer tank supply line L40 may be supplied in the liquefied gas of a liquid phase to be condensed or liquefied by cold thermal energy of the liquefied gas of a liquid phase.

In addition, a buffer tank 40 may be provided with a buffer tank withdrawal line L41. A buffer tank withdrawal line L41 may have one end provided at the top of a buffer tank 40 to withdraw a liquefied gas inside the buffer tank 40. The other end of the buffer tank withdrawal line L41 may be connected to a gas phase transfer line L20. In this case, a BOG generated inside a buffer tank 40 may be withdrawn through the buffer tank withdrawal line L41 and flow through the gas phase transfer line L20. Alternatively, the buffer tank outlet line L41 may be provided so that the other end is connected to a liquefied gas supply line L22. The BOG generated inside a buffer tank (40) may be withdrawn through the buffer tank withdrawal line L41 and supplied to at least one of a GCU, a G/E, and a buffer tank 40.

Although not shown, a stirrer may be provided inside a buffer tank 40. A liquefied gas supplied to a buffer tank 40 may be condensed or liquefied inside the buffer tank 40. Over time, a temperature difference may occur between the top and bottom of the buffer tank 40. A stirrer may ensure heterogeneous mixing of fluids inside a buffer tank 40, thereby preventing a decrease in condensation or liquefaction efficiency inside the buffer tank 40.

Although not shown, a bunkering vessel may be provided with at least one of a liquefied gas re-liquefaction system and an auxiliary boiler instead of a buffer tank 40. Alternatively, a bunkering vessel may be provided with at least one of a buffer tank 40, a reliquefaction system, and an auxiliary boiler. A re-liquefaction system may receive a liquefied gas of a gas phase generated during a bunkering process, liquefy it, and then supply it to a bunkering tank 10. An auxiliary boiler may generate receive a liquefied gas of a gas phase generated during a bunkering process and combust it to generate steam, and then supply the generated steam to a steam demander of a bunkering vessel.

A bunkering vessel according to the present embodiment as described above may be provided with a bunkering tank 10, a manifold 20, a liquefied gas transfer line, a gas supply portion 30, a buffer tank 40, etc. to perform loading and unloading processes for a liquefied gas of a target.

Hereinafter, loading and unloading processes using a bunkering vessel according to an embodiment of the present invention will be described in more detail. Prior to this, the overall process of loading a liquefied gas to and unloading a liquefied gas from a target using a bunkering vessel will be explained.

A bunkering vessel may store a liquefied gas in a bunkering tank 10 for loading it to a liquefied gas storage tank of a target. A bunkering vessel may also initially receive a liquefied gas from an onshore or offshore platform or another bunkering vessel.

A bunkering vessel may operate with a liquefied gas stored in a bunkering tank 10 or it may drive other facilities within the vessel. In other words, a bunkering vessel may use a liquefied gas as fuel even before bunkering, and it may drive a G/E or the like. In addition, a liquefied gas may evaporate inside a bunkering tank 10 to generate a BOG, and treatment of the BOG may be required to manage the internal pressure of the bunkering tank 10. Therefore, a bunkering vessel may use a liquefied gas as fuel even before bunkering. Preferably, a bunkering vessel may use a liquefied gas of a gas phase as fuel. This gas treatment process is a gas-firing process.

A gas-firing process may include withdrawing a BOG generated within a bunkering tank 10 and supplying it to a G/E or the like. At this time, the BOG generated within the bunkering tank 10 may vary depending on the environment in which the bunkering vessel is located or whether the bunkering vessel is in operation. When the flow rate of a BOG generated within a bunkering tank 10 is less than the flow rate of a liquefied gas required by a G/E or the like, a liquefied gas of a liquid phase may further be withdrawn from the bunkering tank 10 and supplied. A gas-firing process may be performed not only before bunkering, but also in all other processes in which a liquefied gas is present inside a bunkering tank 10. Specific details about a gas-firing process will be described later with reference to FIG. 2.

A bunkering vessel may be connected to a target and perform a bunkering process, and may receive and treat a BOG from the target before loading or unloading. A bunkering vessel may receive a BG generated in a liquefied gas storage tank of a target through a manifold 20 and supply it to at least one of a GCU and a buffer tank 40 for treatment. This treatment process is a BOG treatment process. Specific details about a BOG treatment process will be described later with reference to FIG. 3.

A bunkering vessel may supply at least one of a dry gas and an inert gas (inert gas or nitrogen gas) to a liquefied gas storage tank before loading a liquefied gas into a liquefied gas storage tank of a target. A bunkering vessel may supply a gas generated in a gas supply portion 30 to a liquefied gas storage tank so that the internal environment of the liquefied gas storage tank satisfies the environmental conditions required for loading. A process of supplying a dry gas is drying, and a process of supplying an inert gas is inerting.

A drying process is for removing moisture inside a liquefied gas storage tank by injecting a dry gas, which is air that does not contain moisture, into the liquefied gas storage tank. Drying processes may be broadly classified into two types depending on the temperature conditions under which the process is performed. For example, drying processes may be classified into those performed under relatively low temperature conditions, such as winter, and those performed under relatively high temperature conditions, such as summer.

An inerting process may be performed after a drying process, and it is for removing a dry gas filled inside a liquefied gas storage tank by injecting an inert gas into the liquefied gas storage tank. Inerting processes may be broadly classified into two types depending on the type of inert gas used in the process. Hereinafter, an inert gas refers to both an inert gas generated by burning heavy oil and nitrogen gas. For example, inerting processes may be classified into those performed using a gas generated by burning heavy oil and those performed using nitrogen gas. Specific details about a drying process and an inerting process will be described later with reference to FIGS. 4 and 5.

A bunkering vessel may supply a liquefied gas of a relatively small flow rate to a liquefied gas storage tank before loading a liquefied gas into a liquefied gas storage tank of a target. A bunkering vessel may withdraw a part of a liquefied gas of a liquid phase stored in a bunkering tank 10 and supply it to a liquefied gas storage tank. This liquefied gas supply process is gassing up.

A gassing-up process may be carried out in a plurality of stages depending on the environmental conditions inside a liquefied gas storage tank. In addition, a gassing-up process may be divided into a process of supplying a liquefied gas in a liquid phase or a process of supplying a liquefied gas after vaporizing it on a bunkering vessel, depending on the conditions of a target receiving the liquefied gas. A gassing-up process may be performed after drying or inerting, and a gassing-up process is for injecting a liquefied gas into a liquefied gas storage tank to remove a dry gas and an inert gas filled inside the liquefied gas storage tank. Specific details about a gassing-up process will be described later with reference to FIGS. 6 to 9.

A bunkering vessel may further supply a liquefied gas of a relatively small flow rate to a liquefied gas storage tank before loading a liquefied gas into the target liquefied gas storage tank. This liquefied gas supply process is cooling down.

A cooling-down process may turn the inside of a liquefied gas storage tank to a low-temperature state, thereby preventing the formation of a BOG or reducing the amount of a BOG generated when loading a liquefied gas. A cooling-down process may be performed after gassing-up, and may lower the internal temperature of a liquefied gas storage tank by injecting a low-temperature liquefied gas into the liquefied gas storage tank. Specific details about a cooling-down process will be described later with reference to FIG. 10.

A bunkering vessel may load a liquefied gas into a liquefied gas storage tank of a target after a cooling-down process. A bunkering vessel may supply a liquefied gas of a liquid phase to a liquefied gas storage tank of a target and simultaneously receive a low-temperature liquefied gas filled inside the liquefied gas storage tank. Specific details about a loading process will be described later with reference to FIG. 11.

A bunkering vessels may additionally treat a gas generated during loading, unloading, and cooling-down processes. The gas may be a BOG, and may be treated by supplying it to a G/E or the like and burning it, similar to the gas-firing process described above. This gas treatment process is also a gas-firing process. Details of a gas-firing process after bunkering will be described later with reference to FIG. 12.

A bunkering vessel may unload a liquefied gas from a liquefied gas storage tank of a target in a method opposite to loading. A bunkering vessel may increase the temperature inside a liquefied gas storage tank by supplying a liquefied gas to the liquefied gas storage tank after unloading. This liquefied gas supply process is warming up.

In a warming-up process, a liquefied gas remaining inside a liquefied gas storage tank may be discharged by injecting a liquefied gas at a relatively high temperature into the liquefied gas storage tank. A warming-up process may be performed after unloading, and a vaporized liquefied gas may be supplied to a liquefied gas storage tank of a target to vaporize and discharge a remaining liquefied gas that has not been unloaded from the liquefied gas storage tank. A discharge gas discharged at this time may be supplied and processed by a bunkering vessel. In addition, warming-up processes may be classified into processes in which a bunkering vessel receives a liquefied gas of a relatively low temperature and processes in which a bunkering vessel receives a liquefied gas of a relatively high temperature, depending on the conditions of a discharge gas received from a liquefied gas storage tank of a target. Details of a warming-up process will be described later with reference to FIGS. 13 and 14.

A bunkering vessel may supply an inert gas to a liquefied gas storage tank of a target after warming up. A process of supplying an inert gas after unloading is gas freeing.

In a gas-freeing process, an inert gas may be injected to a liquefied gas storage tank of a target to discharge a liquefied gas in the liquefied gas storage tank. The discharge gas discharged at this time may be supplied and treated by a bunkering vessel. Specific details about a gas-freeing process will be described later with reference to FIG. 15.

A bunkering vessel may supply a dry gas to a liquefied gas storage tank of a target after gas freeing. A process of supplying a dry gas after gas freeing is aerating.

In an aerating process, a dry gas may be injected to a liquefied gas storage tank of a target to discharge an inert gas in the liquefied gas storage tank. Specific details about an aerating process will be described later with reference to FIGS. 16 and 17.

Hereinafter, individual processes of loading and unloading using a bunkering vessel according to an embodiment of the present invention will be described in more detail with reference to FIGS. 2 to 17. FIGS. 2 to 17 illustrate a case in which a liquefied gas is liquefied natural gas, but it will be understood that a liquefied gas is not limited to a specific type.

Figure 2:
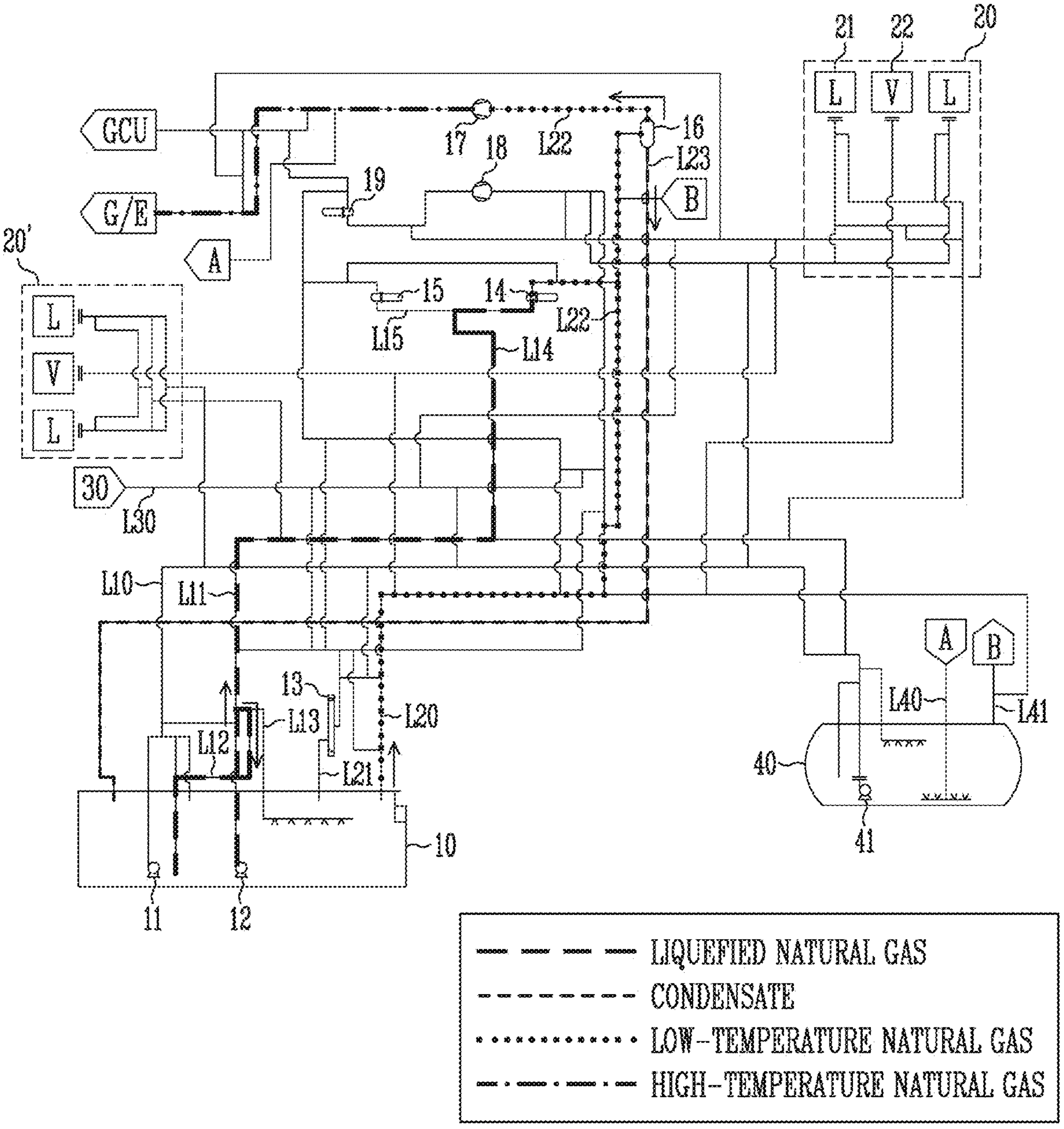
FIG. 2 is a conceptual diagram showing a gas treatment process before bunkering on a bunkering vessel according to an embodiment of the present invention.

FIG. 2 is a conceptual diagram showing a gas-firing process before bunkering on a bunkering vessel according to an embodiment of the present invention. A bunkering vessel may include a bunkering tank 10, a manifold 20, a liquefied gas transfer line, and a buffer tank 40, and the same content as described in FIG. 1 is replaced with the content of the previous embodiment.

A bunkering vessel according to the present embodiment may further include a G/E producing power using a liquefied gas as fuel. A bunkering vessel may produce power by supplying a liquefied gas withdrawn through a liquefied gas transfer line to a G/E through a liquefied gas supply line L14 and L22 and burning it.

A bunkering vessel may receive a liquefied gas for loading from the outside and store it in a bunkering tank 10 before bunkering, that is, before loading a liquefied gas to a target. A bunkering vessel may receive a liquefied gas from the outside through a manifold 20. A bunkering vessel may receive a liquefied gas in a liquid phase through a liquid phase manifold 21 and simultaneously return a liquefied gas in a gas phase through a gas phase manifold 22. A liquid phase manifold 21 may supply a liquefied gas of a liquid phase to a bunkering tank 10 through at least one of a liquid phase transfer line L10 and a spray line L11, and a gas phase manifold 22 may supply a liquefied gas of a gas phase to a bunkering tank through a gas phase transfer line L20.

A liquefied gas stored in a bunkering tank 10 may be withdrawn again through at least one of a liquid phase transfer line L10, a spray line L11, and a gas phase transfer line L20. Although not shown, a bunkering vessel may withdraw a liquefied gas of a liquid phase stored in a bunkering tank 10 through at least one of a liquid phase transfer line L10 and a spray line L11 and delivers it to a liquefied gas supply line L14, and may withdraw a BOG of a liquefied gas generated inside the bunkering tank 10 through a gas phase transfer line L20 and deliver it to a liquefied gas supply line L22.

A bunkering vessel may preferentially withdraw a BOG generated inside a bunkering tank 10 and supply it to a liquefied gas supply line L22. Accordingly, the pressure inside the bunkering tank 10 may be maintained constant or within a safe range. A G/E may produce power used on a bunkering vessel. The flow rate of a BOG generated inside a bunkering tank 10 may vary depending on the temperature of the place where a bunkering vessel is located, operating speed of the bunkering vessel, and the temperature and pressure conditions inside the bunkering tank 10. The flow rate of a BOG gas generated inside a bunkering tank 10 may be relatively small compared to the flow rate required by a G/E. A bunkering vessel may satisfy a required amount of a G/E by additionally withdrawing a part of a liquefied gas of a liquid phase stored in a bunkering tank 10 and supplying it through a liquefied gas supply line L14.

For example, a bunkering vessel may withdraw a BOG through a gas phase transfer line L20 and supply it to a G/E through a liquefied gas supply line L22 branched off from the gas phase transfer line L20. In addition, a bunkering vessel may withdraw a liquefied gas of a liquid through at least one of a liquid phase transfer line L10 and a spray line L11 and supply it to a G/E through a liquefied gas supply line L14 branched off from the liquid phase transfer line L10 or the spray line L11. More specifically, a forced vaporizer 14 may be provided on a liquefied gas supply line L14, and a forced vaporizer 14 may vaporize a liquefied gas of a liquid phase and supplies the vaporized liquefied gas to a liquefied gas supply line L22.

A forced vaporizer 14 may vaporize a liquefied gas using a heat source existing inside a bunkering vessel. A heat source may be seawater, fresh water used inside a bunkering vessel, steam, or an engine exhaust gas generated inside a bunkering vessel, but the type is not limited and any heat source that may vaporize a cryogenic liquefied gas may be used.

A forcibly vaporized liquefied gas and a BOG may be combined in a liquefied gas supply line L22 and supplied to a gas-liquid separator 16 provided on the liquefied gas supply line L22. A gas-liquid separator 16 may temporarily store a supplied liquefied gas, and may be provided in the form of a mist separator or a buffer tank. A gas-liquid separator 16 may separate a supplied liquefied gas into a gas phase and a liquid phase and supply only a liquefied gas of a gas phase through a liquefied gas supply line L22. For example, in the case in which a liquefied gas is liquefied natural gas, the liquefied gas may further include not only methane but also a relatively heavy carbon such as ethane and propane. A gas-liquid separator 16 may form a condensate by condensing a heavy carbon included in a liquefied gas and a part of the liquefied gas, and the formed condensate may be delivered to a bunkering tank 10 through a condensate return line L23.

A liquefied gas of a gas phase received from a gas-liquid separator 16 may be supplied after being pressurized by an LD compressor 17 to a pressure required by a G/E. A liquefied gas pressurized by an LD compressor 17 may be heated to a temperature required by a G/E, but may be at a relatively high temperature compared to the required temperature. For example, when a liquefied gas is liquefied natural gas, a liquefied gas flowing in a front end of an LD compressor 17 may be natural gas at a relatively low temperature as a BOG, and a liquefied gas flowing in a rear end of the LD compressor 17 may be natural gas at a relatively high temperature.

Although not shown, a plurality of LD compressors 17 may be provided in series or in parallel. An LD compressor 17 may be provided with a cooler at a rear end thereof to cool a pressurized liquefied gas. A cooler may cool a liquefied gas to a temperature required by a G/E and supply it to the G/E. A recirculation line (not shown) for one or more LD compressors 17 may be provided on a liquefied gas supply line L22. Alternatively, a recirculation line may be provided inside an LD compressor 17. A recirculation line may adjust the pressure and flow rate of a liquefied gas discharged from an rear end of an LD compressor (17) to the requirements of a G/E.

The above gas firing combustion process has been described as being performed before bunkering on a bunkering vessel, but it is not limited thereto. When a liquefied gas exists inside a bunkering tank 10 of a bunkering vessel, a gas-firing process according to the present embodiment may be performed in parallel in other processes below. In other words, although a gas-firing process according to the present embodiment is not shown in FIGS. 3 to 17, it will be understood that the gas-firing process may be performed simultaneously with a process performed in each drawing.

Figure 3:
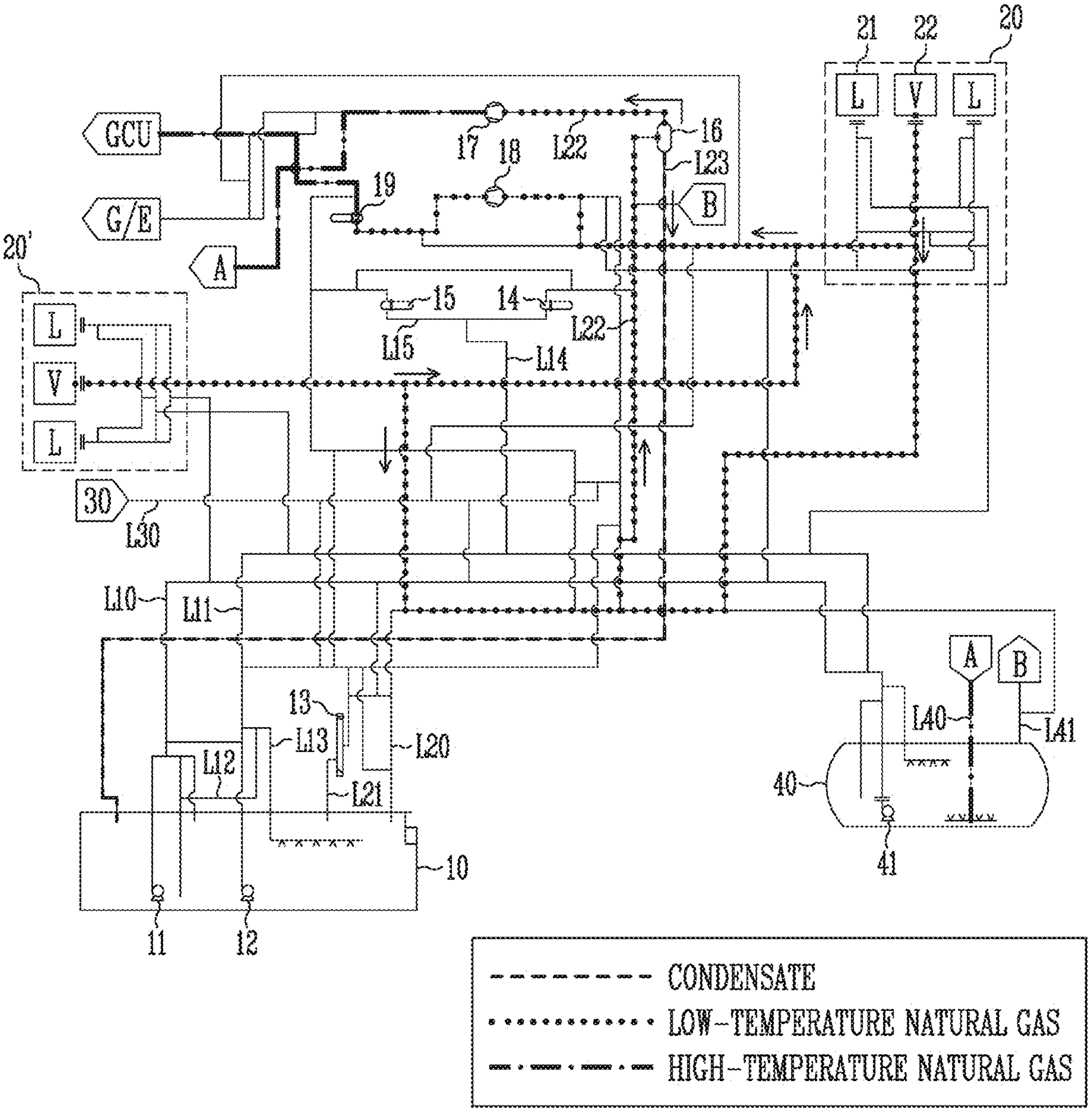
FIG. 3 is a conceptual diagram showing a process of treating a boil-off gas generated in a liquefied gas storage tank before bunkering on a bunkering vessel according to an embodiment of the present invention.

FIG. 3 is a conceptual diagram showing a process of treating a BOG before bunkering on a bunkering vessel according to an embodiment of the present invention. A bunkering vessel may include a bunkering tank 10, a manifold 20, a liquefied gas transfer line, and a buffer tank 40, and the same content as described in FIG. 1 is replaced with the content of the previous embodiment.

A bunkering vessel according to the present embodiment may receive and treat a BOG generated within a liquefied gas storage tank of a target while the bunkering vessel is connected to the target. Preferably, a bunkering vessel may receive and treat a BOG generated within a liquefied gas storage tank of a target before unloading. For example, when a liquefied gas is liquefied natural gas, a bunkering vessel may receive natural gas at a relatively low temperature as a BOG of a liquefied natural gas through a gas phase manifold 22.

A bunkering vessel may receive a BOG through a gas phase manifold 22 of manifold 20 and 20'. A bunkering vessel may transfer a BOG received through a gas phase manifold 22 to a liquefied gas supply line L22 through a gas phase transfer line L20.

In the present embodiment, a plurality of liquefied gas supply lines L22 may be provided in parallel. For example, any one liquefied gas supply line L22 may be provided with a gas-liquid separator 16 and an LD compressor 17, and another liquefied gas supply line may be provided with an HD compressor 18 and a heater 19. A bunkering vessel may treat a BOG received through a gas phase manifold 22 by supplying it to each of a plurality of liquefied gas supply lines L22.

In the present embodiment, a bunkering vessel may process a received BOG using at least one of a GCU and a buffer tank 40.

For example, a BOG may be delivered to a liquefied gas supply line L22 provided with an HD compressor 18 and a heater 19, and the liquefied gas supply line L22 may receive the BOG and supply it to a GCU. A BOG may be pressurized in an HD compressor 18 and further heated in a heater 19 to have the temperature and pressure required by a GCU, and the GCU may treat the BOG by firing it and discharging it to the outside.

For example, a BOG is delivered to a liquefied gas supply line L22 provided with a gas-liquid separator 16 and an LD compressor 17 through a gas phase transfer line L20, and the liquefied gas supply line L22 may receive the BOG and supply it to a buffer tank 40. Separation of a liquefied gas of a gas phase and a condensate through a gas-liquid separator 16 is replaced by the above-described embodiment. A liquefied gas of a gas phase separated in a gas-liquid separator 16 may be supplied to a buffer tank 40 at a relatively high temperature after passing through an LD compressor 17.

A buffer tank 40 may temporarily store at least a part of a pressurized liquefied gas. A buffer tank 40 may receive a liquefied gas of a gas phase through a buffer tank supply line L40. As a liquefied gas of a gas phase flows into a buffer tank 40, which has a relatively large volume, it may expand, and at least a part of it may be liquefied. Alternatively, a liquefied gas of a gas phase may be cooled by a low-temperature liquefied gas previously stored in a buffer tank 40, so that at least a part of it may be condensed or liquefied. A buffer tank 40 may supply a liquefied gas of a liquid phase to a bunkering tank 10 using a pump 41.

In a BOG treatment process according to the present embodiment, a target may be a liquefied gas carrier or a liquefied gas propulsion vessel, and a liquefied gas storage tank may be a pressure container, but it is not limited thereto. Furthermore, in addition to receiving and treating a BOG through a gas phase manifold 22, a gas phase transfer line L20 may also receive a BOG generated inside a bunkering tank 10 of a bunkering vessel and process it in the same manner.

The above BOG treatment process has been described as being performed before unloading from a bunkering vessel as an example, but it is not limited to thereto. A bunkering vessel according to the present embodiment is capable of treating a BOG generated in a liquefied gas storage tank of a target using a GCU and a buffer tank 40 provided on the bunkering vessel, thereby simplifying facilities for treating a BOG on the target and at the same time, adjusting the internal pressure of the liquefied gas storage tank of the target before bunkering so that a bunkering process is carried out smoothly and safely.

Figure 4:
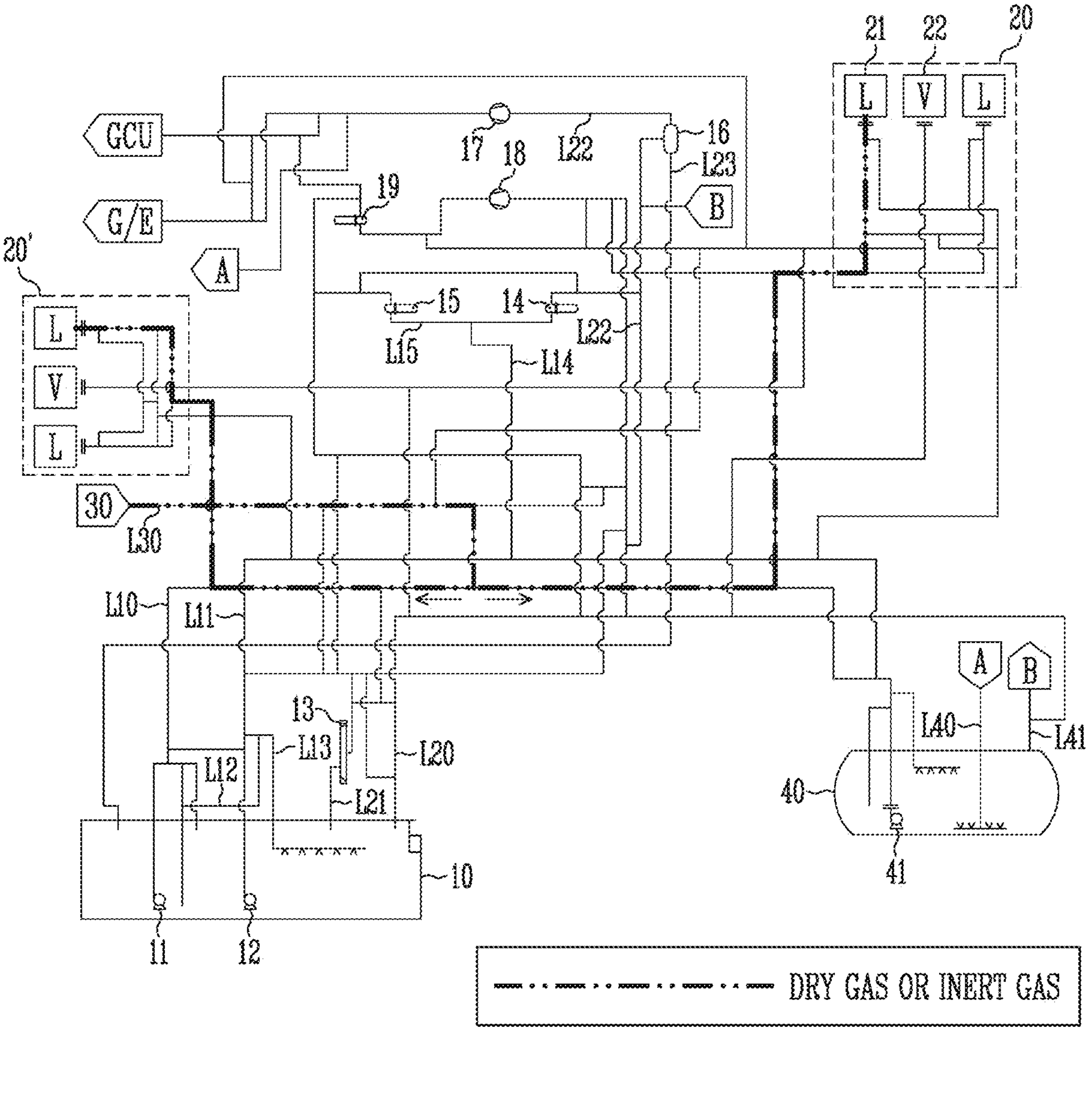
FIG. 4 is a conceptual diagram showing a drying process for supplying a dry gas or an inerting process for supplying an inert gas to a bunkering vessel according to an embodiment of the present invention.
Figure 5:
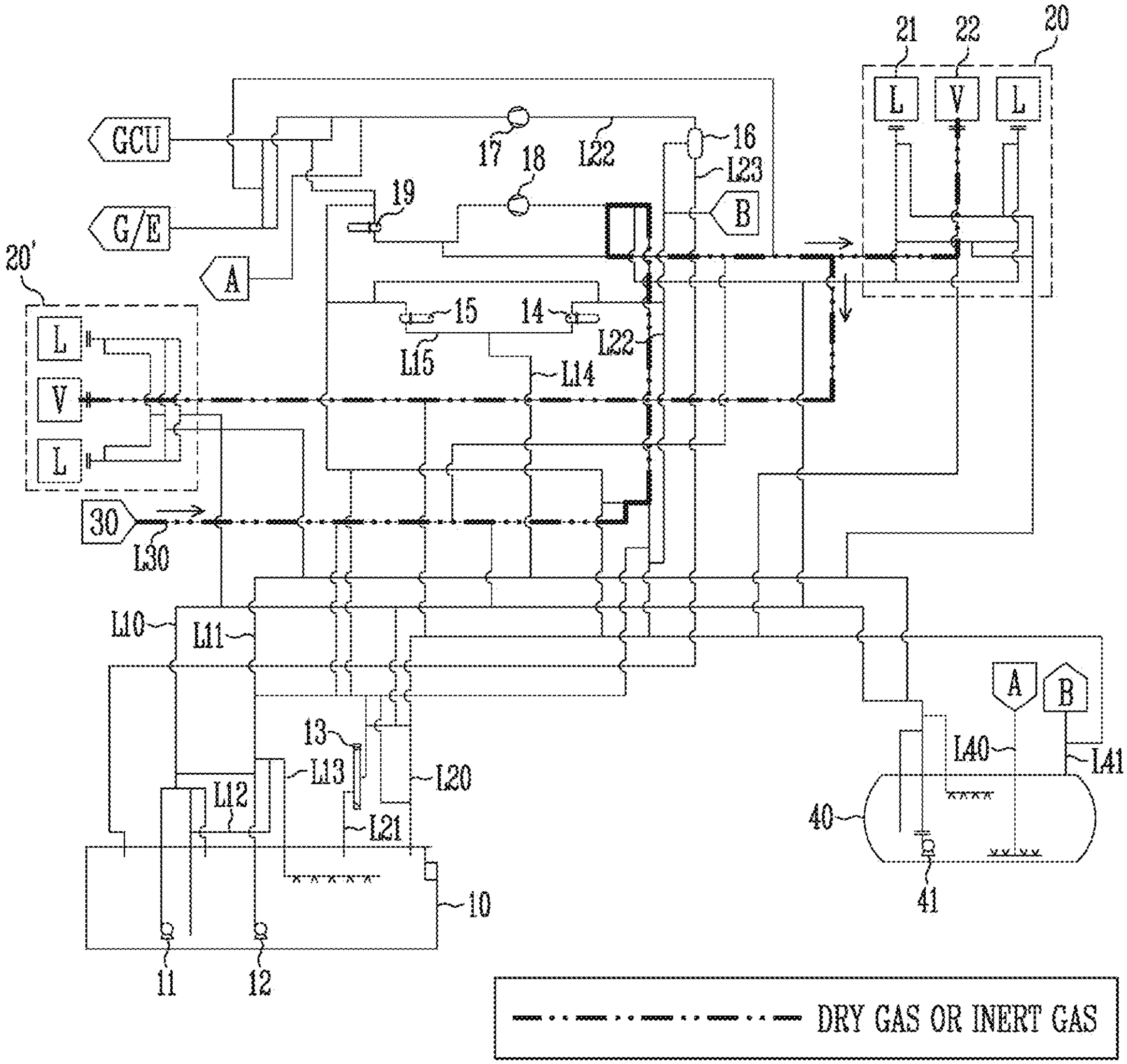
FIG. 5 is a conceptual diagram showing a drying process for supplying a dry gas or an inerting process for supplying an inert gas to a bunkering vessel according to an embodiment of the present invention.

FIGS. 4 and 5 are conceptual diagrams showing a drying process and an inerting process before bunkering on a bunkering vessel according to an embodiment of the present invention. A bunkering vessel may include a bunkering tank 10, a manifold 20, a liquefied gas transfer line, and a gas supply portion 30, and the same content as described in FIG. 1 is replaced with the content of the previous embodiment.

A bunkering vessel according to the present embodiment may supply at least one of a dry gas and an inert gas to a liquefied gas storage tank of a target while the bunkering vessel is connected to the target.

First, an embodiment of a drying process for supplying a dry gas will be described. A drying process may be for supplying a dry gas to a liquefied gas storage tank of a target through a manifold 20, 20' to remove moisture inside the liquefied gas storage tank before loading a liquefied gas to the liquefied gas storage tank of the target.

A liquefied gas storage tank before liquefied gas loading may be full of air. The air may have the same composition as general atmosphere having an oxygen concentration of approximately 20% (v/v) and containing a trace amount of water vapor. The water contained in the air is an extremely small amount compared to oxygen or nitrogen and may be in the form of small water droplets or water vapor. However, when loading a cryogenic liquefied gas, it may be solidified inside a liquefied gas storage tank and damage the liquefied gas storage tank or components provided inside the liquefied gas storage tank such as a pump. Through a drying process, moisture inside a liquefied gas storage tank may be removed to protect the liquefied gas storage tank and other facilities.

A gas supply portion 30 may be a dry gas supply portion, and a dry gas may be nitrogen gas or dry air that does not contain moisture. A dry gas supply portion may produce a dry gas using power produced by a G/E of a bunkering vessel.

A dry gas supply portion may produce a dry gas and supply the dry gas to a liquefied gas storage tank of a target through a gas supply line L30. Since a drying process is performed before loading, a dry gas supply portion may supply a dry gas through a liquefied gas transfer line and a manifold 20 and 20'. A gas supply line L30 may supply a dry gas to a manifold 20 20' through at least one of a liquid phase transfer line L10, a gas phase transfer line L20, and a spray line L11.

At this time, the gas supply line L30 may supply a dry gas through the liquid phase transfer line L10 or the gas phase transfer line L20 depending on the external temperature of a bunkering vessel or the internal temperature of a liquefied gas storage tank of a target. Alternatively, a gas supply line L30 may supply a dry gas through a liquid phase transfer line L10 or a gas phase transfer line L20 depending on the difference in specific gravity between a gas supplied to a bunkering vessel and a gas inside the bunkering vessel. On a bunkering vessel, a manifold 20 and 20' may be connected to a liquefied gas storage tank of a target at a bunkering station through a pipe including an insulating material, but it is affected by the external temperature of the bunkering vessel. Therefore, even when an insulating material is provided in the pipe, a gas moving through the pipe may be heated by receiving heat from the external environment.

A bunkering vessel may supply a dry gas through a liquid phase manifold 21 or a gas phase manifold 22 in consideration of these temperature conditions or specific gravity conditions. It should be noted that each manifold is named based on loading and unloading processes of a liquefied gas. A liquid phase manifold 21 may be connected to not only a liquid phase transfer line L10 provided on a bunkering vessel but also a liquid phase transfer line (not shown) connected to a liquefied gas storage tank of a target through or without a pipe. One end of a liquid phase transfer line in a target may be provided at the bottom of a liquefied gas storage tank, similar to a liquid phase transfer line L10 provided on a bunkering vessel. A gas phase manifold 22 may be connected to not only a gas phase transfer line L20 provided on a bunkering vessel but also a gas transfer line (not shown) connected to a liquefied gas storage tank of a target through or without a pipe. One end of a gas phase transfer line in a target may also be provided at the top of a liquefied gas storage tank, similar to a gas phase transfer line L20 provided on a bunkering vessel.

Referring to FIG. 4 as an embodiment according to the present invention, a gas supply line L30 may supply a dry gas through a liquid phase transfer line L10 when the external temperature of a bunkering vessel is above a predetermined temperature. The predetermined temperature may be an external temperature that may cause the temperature inside a liquefied gas storage tank of a target to be higher than the temperature of the dry gas injected to the liquefied gas storage tank through a manifold 20 and 20'. Here, the predetermined temperature may be approximately 20 to 40° C., but it is not limited thereto and may vary depending on the season or region. For example, in summer, the temperature inside a liquefied gas storage tank of a target may be relatively high, and a bunkering vessel may supply a dry gas through a liquid phase transfer line L10. A gas supply line L30 may supply a dry gas to the bottom of a liquefied gas storage tank after passing through a liquid phase manifold 21 through a liquid phase transfer line L10. A dry gas having a relatively lower temperature than the temperature inside a liquefied gas storage tank may have a heavier weight than the air inside the liquefied gas storage tank, and may be supplied to the bottom of the liquefied gas storage tank to push the air inside the liquefied gas storage tank of a target to the top of the liquefied gas storage tank. Likewise, a gas supply line L30 may supply a dry gas through a liquid phase transfer line L10 when the internal temperature of a liquefied gas storage tank of a target is higher than a predetermined temperature.

Referring to FIG. 5, a gas supply line L30 may supply a dry gas through a gas phase transfer line L20 when the external temperature of a bunkering vessel is lower than a predetermined temperature. For example, in winter, the temperature inside a liquefied gas storage tank of a target may be relatively low, and a bunkering vessel may supply a dry gas through a gas phase transfer line L20. A gas supply line L30 may supply a dry gas to the top of a liquefied gas storage tank after passing through a gas phase manifold 21 through a gas phase transfer line L10. A dry gas having a relatively higher temperature than the temperature inside a liquefied gas storage tank may have a lighter weight than the air inside the liquefied gas storage tank, and may be supplied to the top of the liquefied gas storage tank and move down to the bottom of the liquefied gas storage tank to push the air inside the liquefied gas storage tank to the bottom of the liquefied gas storage tank.

Regardless of a dry gas supply method, a dry gas supply portion may supply a dry gas until the dew point inside the liquefied gas storage tank becomes lower than −20° C. When the dew point inside a liquefied gas storage tank is lower than −20° C., the liquefied gas storage tank may contain less than 1 g of moisture per 1 $m^3$, and an effect on loading of a liquified gas may be minimized within the moisture content range.

In a BOG treatment process according to the present embodiment, a target may be a liquefied gas carrier or a liquefied gas propulsion ship. A liquefied gas storage tank of a target may be a pressure container, but it is not limited thereto.

A bunkering vessel according to the present embodiment may adjust a dry gas supply position in a liquefied gas storage tank in consideration of the temperature conditions or specific gravity conditions of a dry gas received from the bunkering vessel and the inside of the liquefied gas storage tank of a target. When a dry gas is at a relatively high temperature, it may be injected from the top of a liquefied gas storage tank to push the internal air to the bottom, and when a dry gas is at a relatively low temperature, it may injected from the bottom of a liquefied gas storage tank to remove moisture inside the liquefied gas storage tank more effectively using a piston effect of pushing the internal air to the top.

Continuously referring to FIGS. 4 and 5, an embodiment of an inerting process of supplying an inert gas will be described. An inerting process may be to remove an explosive gas inside a liquefied gas storage tank by supplying an inert gas to the liquefied gas storage tank through a manifold 20 and 20' before loading a liquefied gas to a liquefied gas storage tank of a target. Preferably, an inerting process may be to remove a dry gas injected into a liquefied gas storage tank after a drying process. Hereinafter, an explosive gas refers to a gas that may include oxygen and cause a combustion reaction with a liquefied gas as a combustible substance upon loading of the liquefied gas.

A liquefied gas storage tank that has gone through a drying process may be full of a dry gas. When a dry gas is dry air, the dry air may have an oxygen concentration of approximately 20% (v/v). In addition, the dry air may contain a very small amount of moisture. Through an inerting process, an oxygen concentration in a liquefied gas storage tank may be lowered to a safe level, and moisture may be further removed to ensure safety in a bunkering process.

A gas supply portion 30 may be an inert gas supply portion, and an inert gas may be nitrogen gas or a gas generated by combusting heavy oil. An inert gas supply portion may be at least one of a nitrogen gas generator that generates nitrogen gas and an inert gas generator (IGG) that may combust heavy oil.

When an inert gas supply portion is a nitrogen gas generator, the inert gas supply portion may separate nitrogen gas using partial pressure difference of each component in the air using a membrane, or may separate nitrogen gas through pressure swing adsorption (PSA) using an adsorption tower. During a nitrogen gas separation process, nitrogen gas may be separated and supplied at a low temperature of approximately −30° C.

When an inert gas supply portion is an IGG that may combust heavy oil, the inert gas supply portion may generate an inter gas by further combusting a discharge gas discharged from an engine using heavy oil as fuel or by directly combusting heavy oil. In the present invention, the engine may be a propulsion engine using heavy oil, and the heavy oil may be at least one of heavy fuel oil (HFO), marine Diesel oil (MDO), marine gas oil (MGO), but it is not limited thereto.

An inert gas received from an inert gas supply portion may have an oxygen concentration of 5% (v/v) or less, preferably an oxygen concentration of 2% (v/v) or less, and most preferably an oxygen concentration of 1% (v/v) or less.

An inert gas supply portion may produce an inert gas using power produced by a G/E of a bunkering vessel.

The inert gas supply portion may produce an inert gas and supply the inert gas to a liquefied gas storage tank through a gas supply line L30. Since an inerting process is performed before loading, an inert gas supply portion can supply an inert gas through a liquefied gas transfer line and a manifold 20 and 20'. A gas supply line L30 may supply an inert gas to a manifold 20 and 20' through at least one of a liquid phase transfer line L10, a gas phase transfer line L20, and a spray line L11.

At this time, the gas supply line L30 may supply a dry gas through the liquid phase transfer line L10 or the gas phase transfer line L20 depending on the type of inert gas.

Referring to FIG. 4, a gas supply line L30 may supply an inert gas through a liquid phase transfer line L10 when the inert gas received from an inert gas supply portion is a gas generated by combusting heavy oil. When an inert gas is a gas generated by combusting heavy oil, the inert gas may be heavier than a gas inside a liquefied gas storage tank of a target. A gas supply line L30 may supply an inert gas to the bottom of a liquefied gas storage tank of a target by passing through a liquid phase transfer line L10 through a liquid phase manifold 21. A relatively heavy inert gas may be supplied to the bottom of a liquefied gas storage tank, thereby pushing a dry gas inside the liquefied gas storage tank to the top of the liquefied gas storage tank.

Referring to FIG. 5, a gas supply line L30 may supply an inert gas through a gas phase transfer line L20 when the inert gas received from an inert gas supply portion is nitrogen gas. When an inert gas is nitrogen gas, the inert gas may be lighter than a gas inside a liquefied gas storage tank of a target. A gas supply line L30 may supply an inert gas to the top of a liquefied gas storage tank of a target by passing through a gas phase transfer line L20 through a gas phase manifold 22. A relatively light inert gas may be supplied to the top of a liquefied gas storage tank move down to the bottom of the liquefied gas storage tank, thereby pushing a dry gas inside the liquefied gas storage tank to the bottom of the liquefied gas storage tank.

Regardless of the type of inert gas, an inert gas supply portion may supply an inert gas when the dew point inside a liquefied gas storage tank of a target is lower than −20° C., and may supplying the inert gas until the dew point inside the liquefied gas storage tank is lowered below −40° C. When the dew point inside a liquefied gas storage tank becomes lower than −40° C., the liquefied gas storage tank may contain less than 0.1 g of moisture per 1 $m^3$.

In addition, an inert gas supply portion may supply an inert gas until the oxygen concentration inside a liquefied gas storage tank is lowered below 2% (v/v). When the oxygen concentration inside a liquefied gas storage tank is lowered below 2% (v/v), the risk of explosion within the liquefied gas storage tank is significantly lowered.

In the BOG treatment process according to the present embodiment, a target may be a liquefied gas carrier. A liquefied gas storage tank of a target may be a pressure container, but it is not limited thereto.

A bunkering vessel according to the present embodiment may remove moisture and oxygen inside a liquefied gas storage tank using an inert gas generated inside a bunkering vessel, and adjust a supply position in the liquefied gas storage tank according to the properties of the inert gas, thereby removing moisture and oxygen inside the liquefied gas storage tank more effectively using a piston effect.

Figure 6:
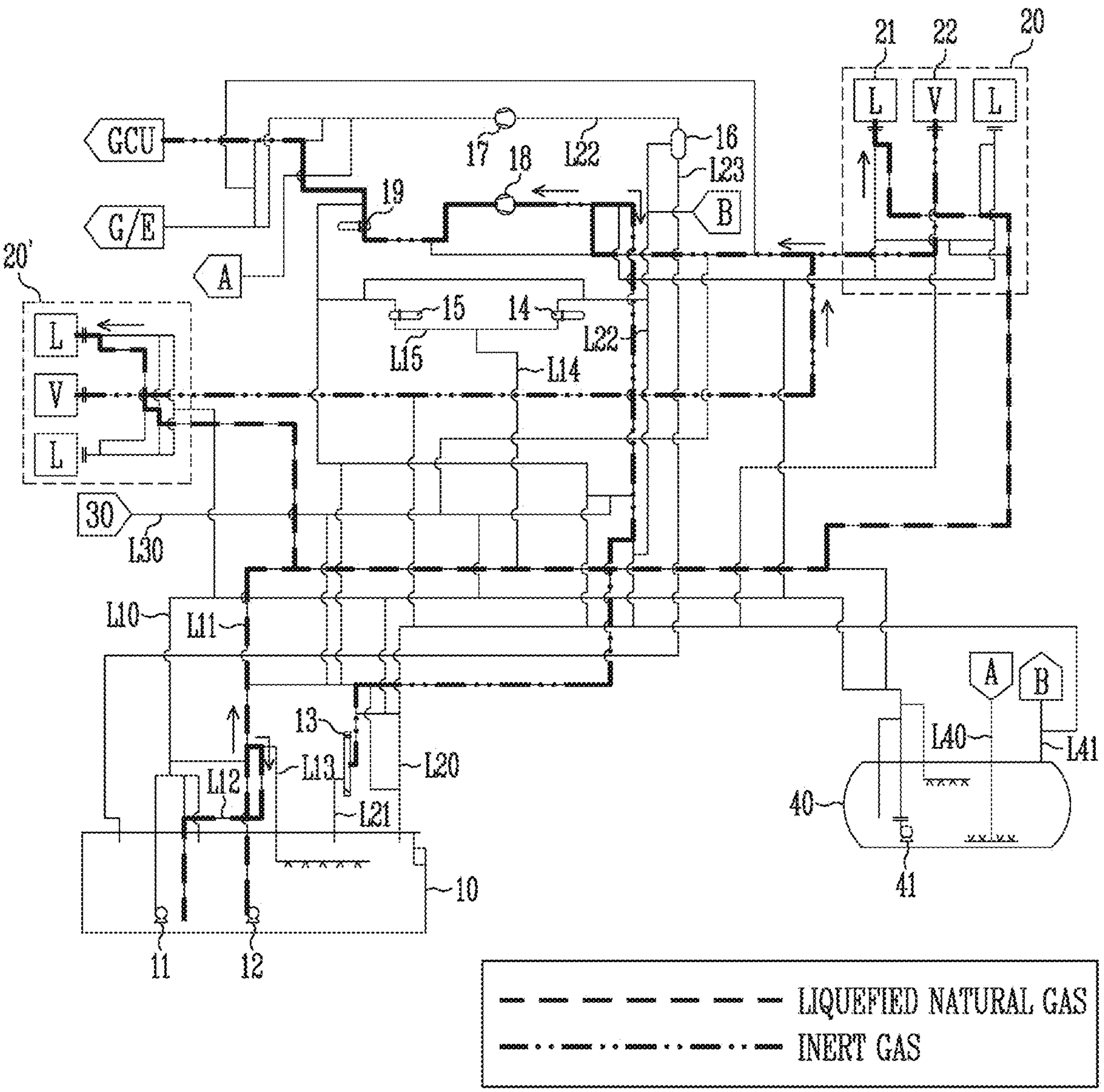
FIG. 6 is a conceptual diagram showing a first gassing-up process for supplying a liquefied gas from a bunkering vessel to a liquefied gas carrier according to an embodiment of the present invention.
Figure 7:
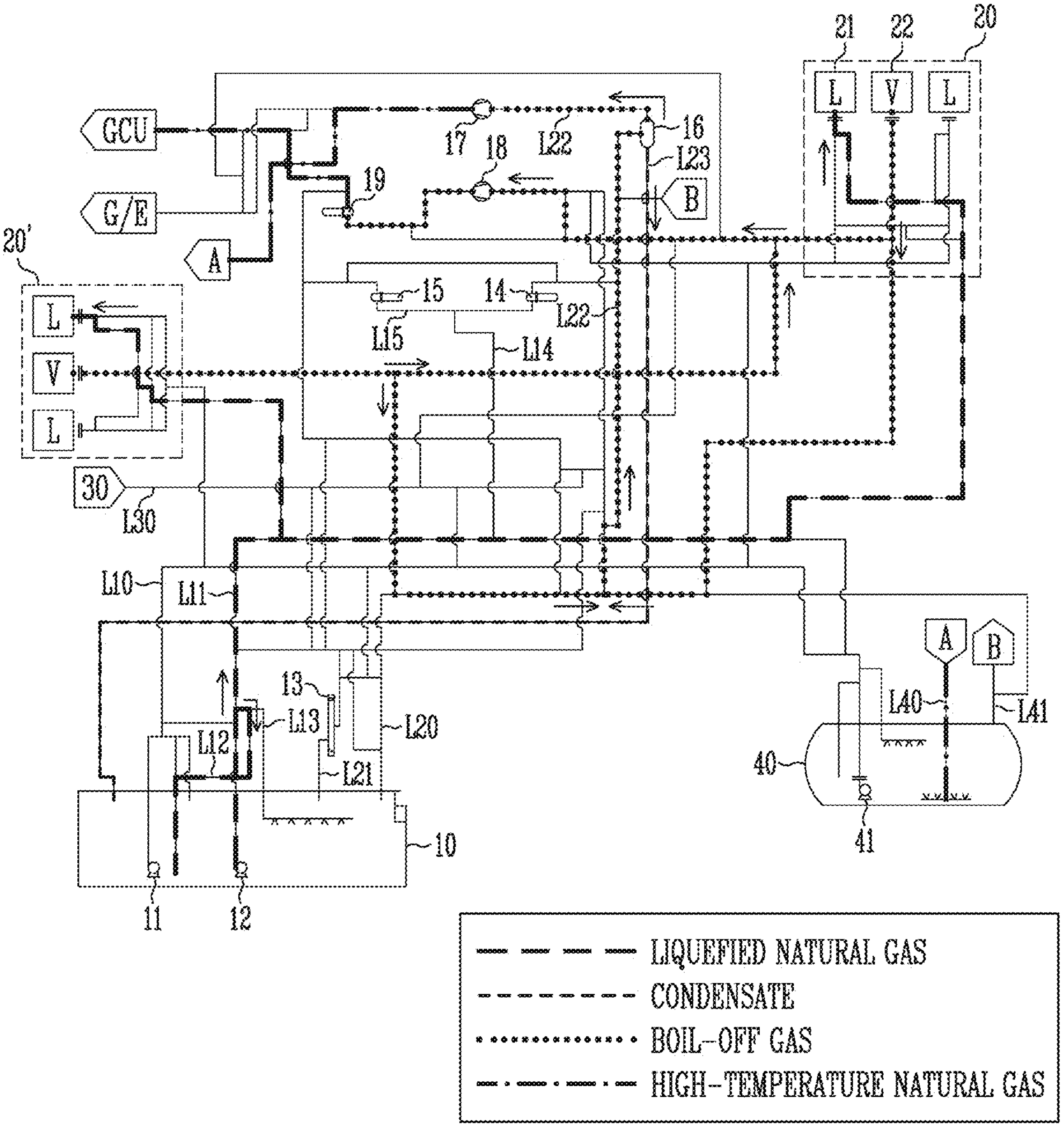
FIG. 7 is a conceptual diagram showing a second gassing-up process for supplying a liquefied gas from a bunkering vessel to a liquefied gas carrier according to an embodiment of the present invention.

FIGS. 6 and 7 are conceptual diagrams showing a gassing-up process before bunkering on a bunkering vessel to a liquefied gas carrier provided with a liquefied gas vaporizer according to an embodiment of the present invention. A bunkering vessel may include a bunkering tank 10, a manifold 20, a liquefied gas transfer line, and a buffer tank 40, and the same content as described in FIG. 1 is replaced with the content of the previous embodiment.

A bunkering vessel according to the present embodiment may supply a liquefied gas to a liquefied gas storage tank of a liquefied gas carrier and receive a discharge gas discharged from the liquefied gas carrier while the bunkering vessel is connected to the target.

A gassing-up process may be divided into a first stage and a second stage according to the composition inside a liquefied gas storage tank of a liquefied gas carrier. For example, a gassing-up process may be divided into a first stage of supplying a liquefied gas until the concentration of the liquefied gas of a gas phase inside a liquefied gas storage tank reaches 5% (v/v) and a second stage of supplying the liquefied gas until the concentration of the liquefied gas of a gas phase inside the liquefied gas storage tank exceeds 99% (v/v).

A gassing-up process may be supplying at least a part of a liquefied gas to a liquefied gas storage tank through a manifold 20 and 20' to remove a gas stored inside the liquefied gas storage tank, before loading the liquefied gas to the liquefied gas storage tank of a liquefied gas carrier. Preferably, a gassing-up process may be to remove an inert gas that has been injected into a liquefied gas storage tank, after an inerting process. This may be supplying a liquefied gas at a relatively small flow rate compared to a flow rate upon full-scale loading of the liquefied gas.

A liquefied gas storage tank before liquefied gas loading may be full of an inert gas. An inert gas may contain carbon dioxide. As a liquefied gas is later loaded, carbon dioxide contained in an inert gas may be sublimated by the cryogenic liquefied gas, damaging a liquefied gas storage tank or components provided inside the liquefied gas storage tank such as a pump. Through a gassing process, carbon dioxide inside a liquefied gas storage tank may be removed to protect the liquefied gas storage tank and other facilities.

A bunkering vessel may supply a liquefied gas to a liquefied gas storage tank of a liquefied gas carrier using a liquefied gas transfer line. Since a gassing-up process is performed before loading, a bunkering vessel may supply a liquefied gas of a liquid phase through a liquefied gas transfer line and a manifold 20 and 20'. A bunkering vessel can supply a liquefied gas of a liquid phase to a liquid phase manifold 21 through at least one of a liquid phase transfer line L10 and a spray line L11.

More specifically, a bunkering vessel may supply a liquefied gas of a liquid phase to a liquefied gas vaporizer of a liquefied gas carrier through a liquid phase manifold 21. A liquefied gas vaporized in a liquefied gas vaporizer may be injected as a gas phase into a liquefied gas storage tank of a liquefied gas carrier. As a gas phase liquefied gas is injected into a liquefied gas storage tank, a gas stored inside a liquefied gas storage tank may be discharged. This discharge gas may be an inert gas, and may be supplied to a bunkering vessel through a gas phase manifold 22 of the bunkering vessel.

A bunkering vessel may receive and treat a discharge gas discharged from a liquefied gas carrier through a gas phase transfer line L20.

Referring to FIG. 6, a first stage may be represented as an initial stage of gassing up, that is, when a liquefied gas is vaporized and injected into a liquefied gas storage tank, and most of the discharge gas discharged from the liquefied gas storage tank is an inert gas. As described above, a gas phase transfer line L20 may transfer a discharge gas to a least one of a GCU and a vent portion 13 until the concentration of a liquefied gas of a gas phase inside a liquefied gas storage tank reaches 5% (v/v). For example, a gas phase transfer line L20 may supply a discharge gas to a GCU when the concentration of an inert gas contained in the discharge gas is lower than a predetermined value or to a vent portion 13 when the concentration of the inert gas is higher than or equal to the predetermined value. The predetermined value may be approximately 95%.

A gas phase transfer line L20 may treat a discharge gas by supplying it to a GCU through a liquefied gas supply line L22. A liquefied gas supply line L22 may be provided with an HD compressor 18 and pressurize an inert gas to a pressure required by a GCU and then supply it to the GCU. Alternatively, a gas phase transfer line L20 may treat a discharge gas by supplying it to a vent portion 13 and discharging it to the outside.

Referring to FIG. 7, a gas phase transfer line L20 may supply a discharge gas to at least one of a GCU and a buffer tank 40 when the concentration of an inert gas contained in the discharge gas is lower than a predetermined value. FIG. 7 may represent a second stage after initial gassing up when a liquefied gas is vaporized and injected, and most of a discharge gas discharged from a liquefied gas storage tank is a liquefied gas of a gas phase or a BOG. A gas phase transfer line L20 may supply a discharge gas to a GCU when the concentration of a liquefied gas of a gas phase inside a liquefied gas storage tank exceeds 5% (v/v) or to a buffer tank 40 when the concentration of the liquefied gas is approximately 90% (v/v).

A gas phase transfer line L20 may treat a discharge gas by supplying it to a GCU through a liquefied gas supply line L22 provided with an HD compressor 18. Alternatively, a gas phase transfer line L20 may treat a discharge gas by supplying it to a buffer tank 40 through a liquefied gas supply line L22 provided with an LD compressor 17. When a discharge gas is supplied to a buffer tank 40, a condensate component of the discharge gas may be separated while passing through a gas-liquid separator 16 at a front end of an LD compressor 17. When the capacity of a buffer tank 40 is full, a discharge gas may be supplied to a GCU to be treated.

As a discharge gas pressurized by an LD compressor 17 expands while it is supplied to a buffer tank 40, at least a part of the discharge gas may be condensed or liquefied to form a liquefied gas of a liquid phase. A buffer tank 40 may supply a liquefied gas of a liquid phase to a liquid phase transfer line L10 using a pump 41, and the liquefied gas of a liquid phase may be returned to a bunkering tank 10 or again supplied to a liquid phase manifold 21.

A bunkering vessel according to the present embodiment may supply a liquefied gas to a liquefied gas carrier provided with a liquefied gas vaporizer and inject the liquefied gas vaporized in the liquefied gas vaporizer into a liquefied gas storage tank, thereby removing an inert gas inside the liquefied gas storage tank. At this time, a treatment method of a discharge gas discharged from the liquefied gas storage tank may be performed differently depending on the degree of removal of the inert gas, and in a second stage of a gassing-up process with a high liquefied gas content, the discharge gas may be supplied to a buffer tank to reuse a liquefied gas in the discharge gas.

Figure 8:
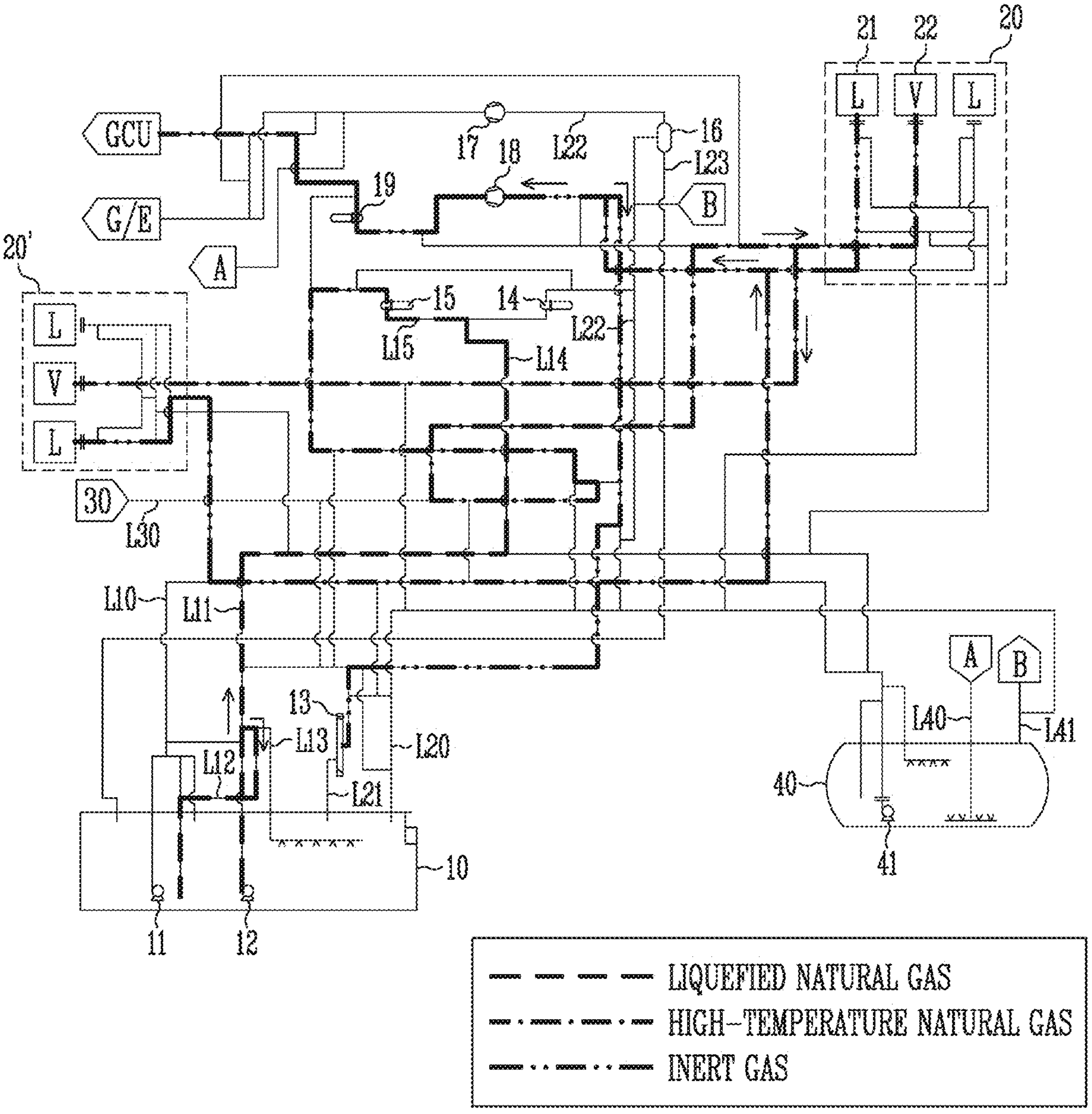
FIG. 8 is a conceptual diagram showing a first gassing-up process for supplying a liquefied gas from a bunkering vessel to a liquefied gas propulsion vessel according to an embodiment of the present invention.
Figure 9:
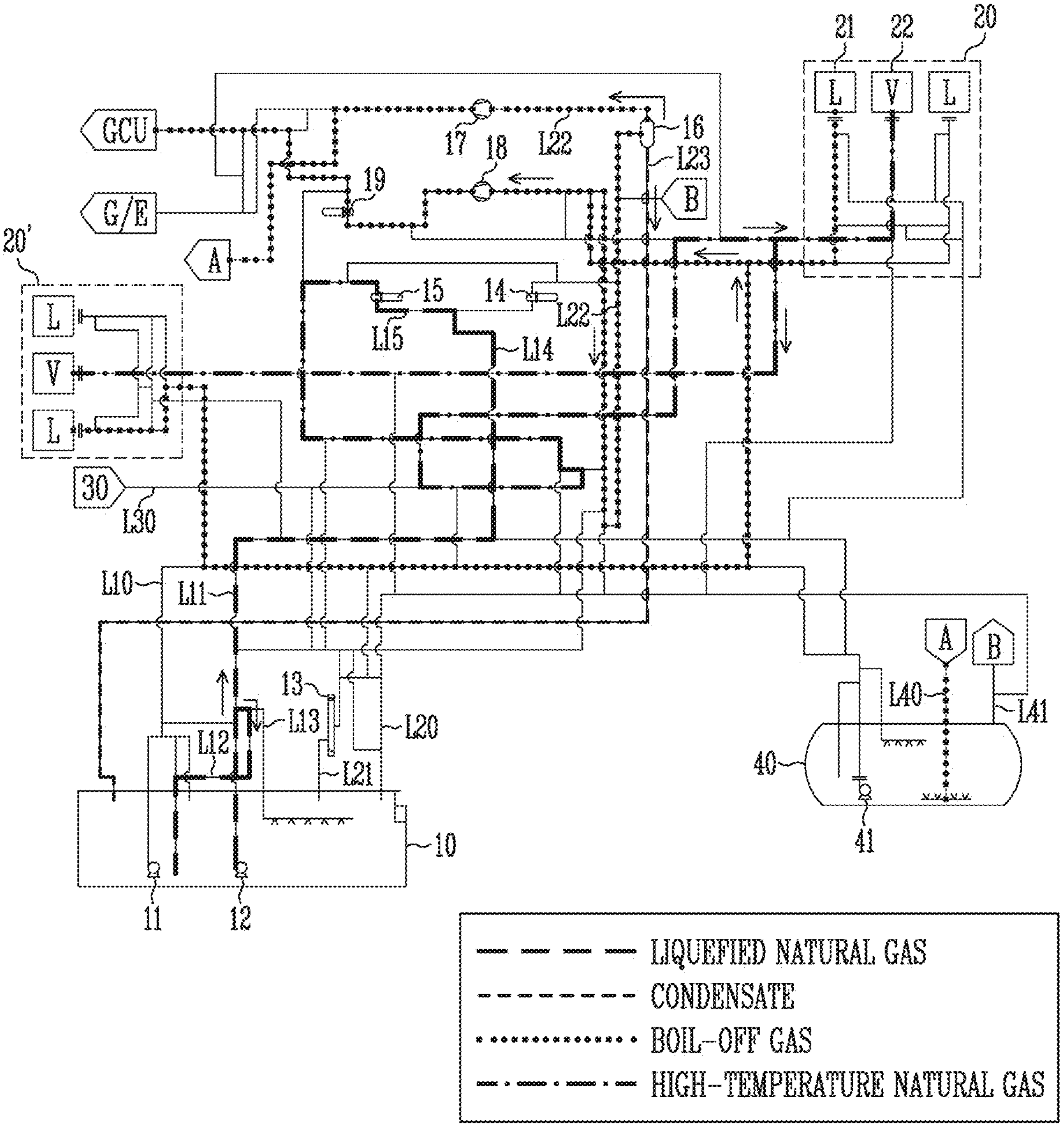
FIG. 9 is a conceptual diagram showing a second gassing-up process for supplying a liquefied gas from a bunkering vessel to a liquefied gas propulsion vessel according to an embodiment of the present invention.

FIGS. 8 and 9 are conceptual diagrams showing a gassing-up process before bunkering on a bunkering vessel to a liquefied gas propulsion ship provided with no liquefied gas vaporizer according to an embodiment of the present invention. A bunkering vessel may include a bunkering tank 10, a liquefied gas vaporizer 15, a manifold 20, a liquefied gas transfer line, and a buffer tank 40, and the same content as described in FIG. 1 is replaced with the content of the previous embodiment.

A bunkering vessel according to the present embodiment may supply a liquefied gas to a liquefied gas storage tank of a liquefied gas propulsion ship and receive a discharge gas discharged from a liquefied gas carrier while the bunkering vessel is connected to the target.

A gassing-up process may be divided into a first stage and a second stage according to the composition of the inside of a liquefied gas storage tank of a liquefied gas carrier, and the classification criteria for each stage are the same as the above-described embodiment.

A gassing-up process may be to remove a gas that has been stored in the inside of a liquefied gas storage tank by supplying a part of a liquefied gas to the liquefied gas storage tank through a manifold 20 and 20', before loading the liquefied gas into the liquefied gas storage tank of a liquefied gas carrier.

A bunkering vessel may supply a liquefied gas to a liquefied gas storage tank of a liquefied gas carrier using a liquefied gas transfer line. Since a gassing-up process is performed before loading, a bunkering vessel may supply a liquefied gas through a liquefied gas transfer line and a manifold 20 and 20'. At this time, the bunkering vessel may withdraw the liquefied gas of a liquid phase through at least one of a liquid phase transfer line L10 and a spray line L11 and supply it to a liquefied gas vaporization line L15 branched off from the liquid phase transfer line L10. More specifically, a liquefied gas vaporization line L15 is branched off from a liquefied gas supply line L14, and a liquefied gas of a liquid phase supplied to a liquid phase transfer line L10 may be supplied to the liquefied gas vaporization line L15 through the liquefied gas supply line L14.

A liquefied gas vaporization line L15 may be provided with a liquefied gas vaporizer 15 vaporizing a liquefied gas of a liquid phase. A liquefied gas vaporization line L15 may have one end connected to a liquefied gas supply line L14 and the other end connected to a gas phase manifold 22 to vaporize a liquefied gas and supply it to a liquefied gas propulsion ship. A liquefied gas vaporizer 15 may vaporize a liquefied gas in the same manner as the forced vaporizer 14 described above.

A bunkering vessel may vaporize in advance a liquefied gas in a liquefied gas vaporizer 15 provided in the bunkering vessel and then supply a liquefied gas of a gas phase to a liquefied gas storage tank of a liquefied gas propulsion ship through a gas phase manifold 22. A liquefied gas propulsion ship may perform a gassing-up process by receiving a liquefied gas of a gas phase through a gas phase manifold 22 and supplying it as is to a liquefied gas storage tank.

As a liquefied gas of a gas phase is injected into a liquefied gas storage tank of a liquefied gas propulsion ship, a gas that has been stored inside the liquefied gas storage tank may be discharged. This discharge gas may be an inert gas and may be supplied to a bunkering vessel through a liquid manifold 21 of the bunkering vessel. A liquefied gas of a gas phase may have a relatively low specific gravity compared to an exhaust gas and may be relatively light. A relatively light liquefied gas may be injected into the top of a liquefied gas storage tank of a liquefied gas propulsion ship to push a relatively heavy inert gas to the bottom.

A bunkering vessel may receive and treat a discharge gas discharged from a liquefied gas propulsion ship through a gas phase transfer line L20.

Referring to FIG. 8, a liquid phase transfer line L10 may supply an exhaust gas to at least one of a GCU and a vent portion 13 when the concentration of an inert gas contained in a discharge gas is higher than a predetermined value. FIG. 8 may represent a first stage of gassing up as an initial stage when most of a discharge gas discharged from a liquefied gas storage tank is an inert gas. As described above, a liquid phase transfer line L10 may supply a discharge gas to at least one of a GCU and a vent portion 13 until the concentration of a liquefied gas of a gas phase inside a liquefied gas storage tank reaches 5% (v/v).

A liquid phase transfer line L10 may treat a discharge gas by supplying it to a GCU through a liquefied gas supply line L22. For example, a liquefied gas supply line may be provided with an HD compressor 18 and pressurize an inert gas to a pressure required by a GCU and then supply it to the GCU. Alternatively, a liquid phase transfer line L10 may treat a discharge gas by supplying it to a vent portion 13 and discharging it to the outside.

Referring to FIG. 9, a liquid phase transfer line L10 may supply a discharge gas to at least one of a GCU and a buffer tank 40 when the concentration of an inert gas contained in the discharge gas is lower than a predetermined value. FIG. 9 may represent a second stage after initial gassing up when a liquefied gas is vaporized and injected, and most of a discharge gas discharged from a liquefied gas storage tank is a liquefied gas of a gas phase or a BOG. As described above, a liquid phase transfer line L10 may supply a discharge gas to a GCU when the concentration of a liquefied gas of a gas phase inside a liquefied gas storage tank exceeds 5% (v/v) or to a buffer tank 40 when the concentration of the liquefied gas is approximately 90% (v/v). A gas phase transfer line L20 may treat a discharge gas by supplying it to a GCU through a liquefied gas supply line L22 provided with an HD compressor 18. Alternatively, a gas phase transfer line L20 may treat a discharge gas by supplying it to a buffer tank 40 through a liquefied gas supply line L22 provided with an LD compressor 17. When a discharge gas is supplied to a buffer tank 40, a condensate component of the discharge gas may be separated while passing through a gas-liquid separator 16 at a front end of an LD compressor 17.

As a discharge gas pressurized by an LD compressor 17 expands while it is supplied to a buffer tank 40, at least a part of the discharge gas may be condensed or liquefied to form a liquefied gas of a liquid phase. A buffer tank 40 may supply a liquefied gas of a liquid phase to a liquid phase transfer line L10 using a pump 41, and the liquefied gas of a liquid phase may be returned to a bunkering tank 10 or again supplied to a gas phase manifold 22 through a liquefied gas vaporizer 15.

A bunkering vessel according to the present embodiment may use a liquefied gas vaporizer provided in the bunkering vessel to inject a liquefied gas of a gas phase to a liquefied gas carrier provided with no liquefied gas vaporizer, thereby removing an inert gas inside a liquefied gas storage tank. At this time, a treatment method of a discharge gas discharged from the liquefied gas storage tank may be performed differently depending on the degree of removal of the inert gas, and in a second stage of a gassing-up process with a high liquefied gas content, the discharge gas may be supplied to a buffer tank to reuse a liquefied gas in the discharge gas.

Figure 10:
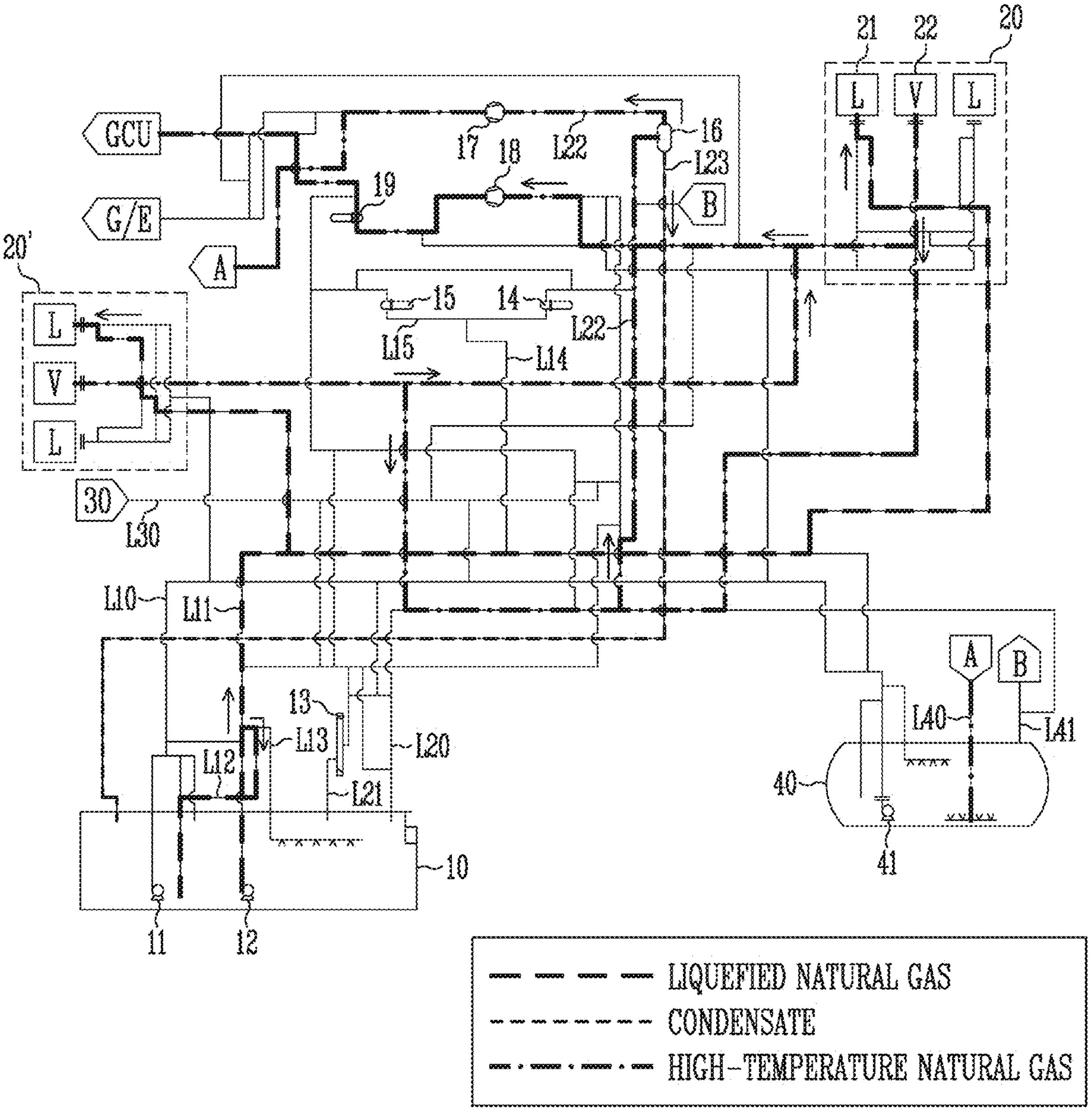
FIG. 10 is a conceptual diagram showing a cooling-down process for supplying a liquefied gas on a bunkering vessel according to an embodiment of the present invention.

FIG. 10 is a conceptual diagram showing a cooling-down process before bunkering on a bunkering vessel according to an embodiment of the present invention. A bunkering vessel may include a bunkering tank 10, a manifold 20, a liquefied gas transfer line, and a buffer tank 40, and the same content as described in FIG. 1 is replaced with the content of the previous embodiment.

A bunkering vessel according to the present embodiment may lower the internal temperature of a liquefied gas storage tank by supplying a small amount of liquefied gas to the liquefied gas storage tank of a target while the bunkering vessel is connected to the target.

A cooling-down process may removing a gas that has been stored inside a liquefied gas storage tank by supplying a small amount of cryogenic liquefied gas as a liquid phase to the liquefied gas storage tank before loading the liquefied gas into the liquefied gas storage tank of a target. Preferably, a bunkering vessel may supply a liquefied gas to a liquefied gas storage tank of a target after a gassing-up process and receive a liquefied gas of a gas phase at a relatively high temperature discharged from the liquefied gas storage tank.

More specifically, a bunkering vessel may receive a liquefied gas at a relatively high temperature from a liquefied gas storage tank in an early stage of cooling down, and then receive a liquefied gas at a relatively low temperature.

A liquefied gas storage tank before liquefied gas loading may be full of a liquefied gas of a gas phase which is at a relatively high temperature compared to a liquefied gas of a liquid phase. A cooling-down process is for reducing the amount of a liquefied gas vaporized by the high-temperature liquefied gas of a gas phase upon loading a liquefied gas. Furthermore, when a cryogenic liquefied gas of a liquid phase is suddenly injected into a liquefied gas storage tank upon loading a liquefied gas, components inside the liquefied gas storage tank such as a barrier structure and a pump may be damaged. Through a cooling-down process, the temperature inside a liquefied gas storage tank may be lowered to a temperature similar to a liquefied gas of a liquid phase, thereby protecting the liquefied gas storage tank and other facilities.

A bunkering vessel may supply a liquefied gas to a liquefied gas storage tank of a target using a liquefied gas transfer line. Since a cooling-down process is performed before loading, a bunkering vessel may supply a liquefied gas through a liquefied gas transfer line and a manifold 20 and 20'. At this time, the bunkering vessel may withdraw the liquefied gas through at least one of a liquid phase transfer line L10 and a spray line L11 and supply the liquefied gas to the liquefied gas storage tank through a liquid phase manifold 21.

As a liquefied gas of a liquid phase is injected a liquefied gas storage tank of a target through a liquid phase manifold 21, the liquefied gas of a liquid phase may push a liquefied gas of a gas phase inside the liquefied gas storage tank to the top of the liquefied gas storage tank. Specifically, a liquefied gas of a liquid phase may be injected into a liquefied gas storage tank of a target through a liquid phase manifold 21, and may be sprayed through a spray provided at the top of the liquefied gas storage tank.

A bunkering vessel may receive a liquefied gas of a gas phase discharged from a liquefied gas storage tank through a gas phase manifold 22. A bunkering vessel may treat a liquefied gas of a gas phase received from a liquefied gas storage tank through a gas phase transfer line L20 by supplying it to at least one of a GCU and a buffer tank 40. A process of supplying a liquefied gas of a gas phase to at least one of a GCU and a buffer tank 40 through a liquefied gas supply line L22 and a treatment process in each of them are replaced with the above-described embodiment.

A bunkering vessel may supply a liquefied gas of a liquid phase until the temperature inside a liquefied gas storage tank is lowered below −130° C.

In a BOG treatment process according to the present embodiment, a target may be a liquefied gas carrier or a liquefied gas propulsion ship, and a liquefied gas storage tank may be a pressure container, but it is not limited thereto.

A bunkering vessel according to the present embodiment may supply a liquefied gas of a liquid phase to the top of a liquefied gas storage tank through a spray to adjust the temperature inside the liquefied gas storage tank to be suitable for loading. An exhaust gas discharged at this time has a high content of liquefied gas, so it may be supplied to a buffer tank and a liquefied gas in the discharge gas may be reused.

Figure 11:
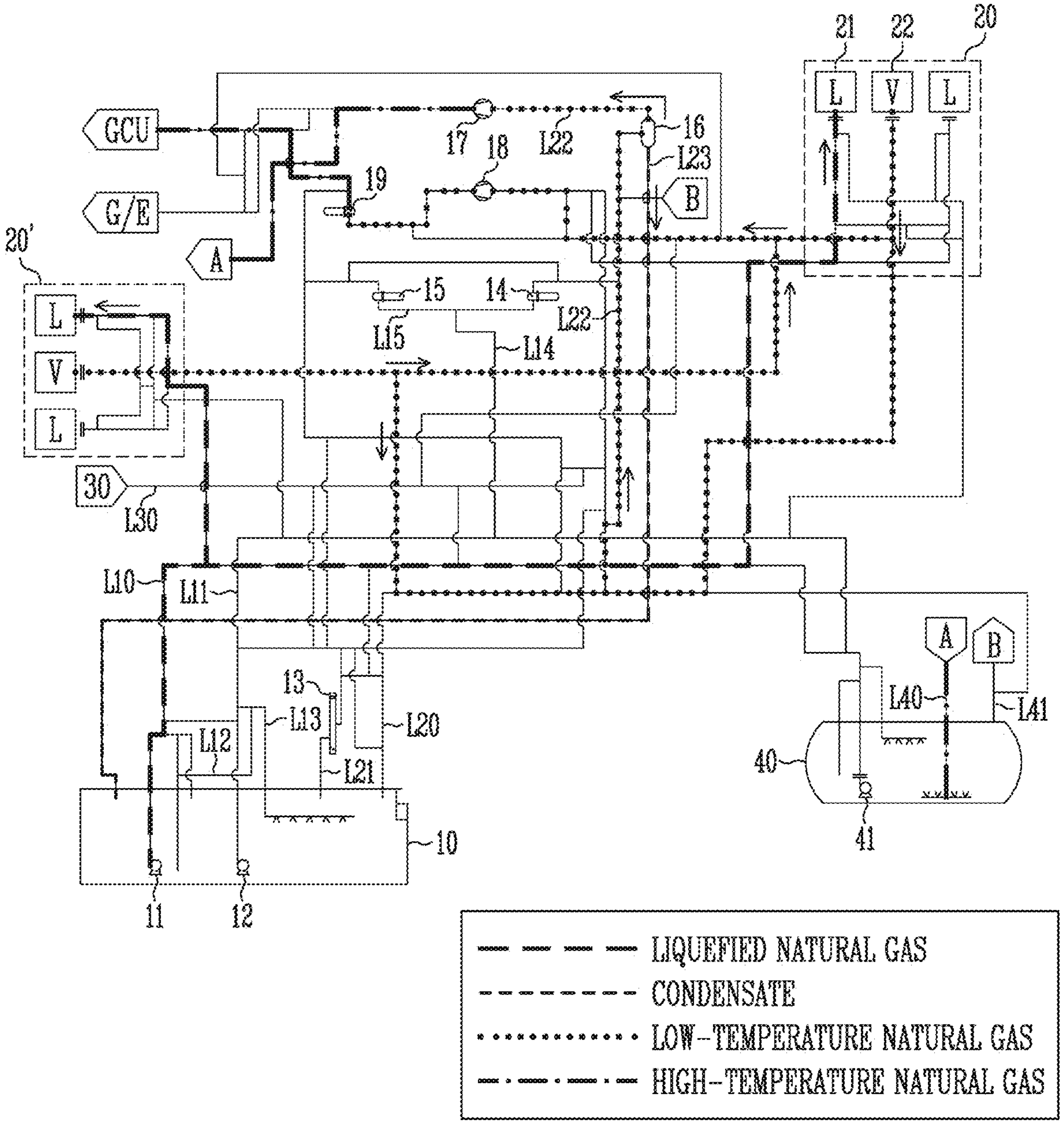
FIG. 11 is a conceptual diagram showing a process of loading a liquefied gas from a bunkering vessel to a liquefied gas storage tank of a target according to an embodiment of the present invention.

FIG. 11 is a conceptual diagram showing a loading process on a bunkering vessel according to an embodiment of the present invention. A bunkering vessel may include a bunkering tank 10, a manifold 20, a liquefied gas transfer line, and a buffer tank 40, and the same content as described in FIG. 1 is replaced with the content of the previous embodiment.

A bunkering vessel according to the present embodiment may supply a liquefied gas to a liquefied gas storage tank of a target while the bunkering vessel is connected to the target. According to the above-described process, the inside of a liquefied gas storage tank of a target may be in suitable conditions for loading a cryogenic liquefied gas.

A bunkering vessel may supply a liquefied gas of a liquid phase to a liquefied gas storage tank of a target using a liquefied gas supply line and a manifold 20 and 20'. Specifically, a bunkering vessel may withdraw a liquefied gas of a bunkering tank 10 through a liquid phase transfer line L10 and supply it to a liquefied gas storage tank through a liquid phase manifold 21.

The inside of a liquefied gas storage tank of a target may be full of a liquefied gas of a gas phase at a relatively low temperature supplied during a cooling-down process. A bunkering vessel may receive a liquefied gas of a gas phase discharged from a liquefied gas storage tank through a gas phase manifold 22. A bunkering vessel may treat a liquefied gas of a gas phase received from a liquefied gas storage tank through a gas phase transfer line L20 by supplying it to at least one of a GCU and a buffer tank (40). A process of supplying a liquefied gas of a gas phase to at least one of a GCU and a buffer tank 40 through a liquefied gas supply line L22 and a treatment process in each of them are replaced with the above-described embodiment.

In a BOG treatment process according to the present embodiment, a target may be a liquefied gas carrier or a liquefied gas propulsion ship, and a liquefied gas storage tank may be a pressure container, but it is not limited thereto.

An unloading process on a bunkering vessel may be accomplished by reversely performing a loading process. A bunkering vessel may withdraw a liquefied gas stored in a liquefied gas storage tank through a liquid phase manifold 21. When a loading process to a liquefied gas carrier is performed, a liquefied gas of a gas phase that is discharged may be treated on the liquefied gas carrier, but it may also be supplied to a bunkering vessel to be treated.

A bunkering vessel according to the present embodiment may load a liquefied gas of a liquid phase to a target vessel and at the same time, it may supply a liquefied gas of a gas phase discharged from a the liquefied gas storage tank to reuse the liquefied gas.

A liquefied gas transfer line may be connected to a liquefied gas supply line L14 and L22. Specifically, a liquefied gas supply line L22 may be branched off from a gas phase transfer line L20 and supply a liquefied gas of a gas phase to at least one of a GCU, a G/E, and a buffer tank 40. A GCU may treat a liquefied gas by combusting it and then discharge it to the outside of a bunkering vessel. A G/E may produce power using a liquefied gas as fuel. Preferably, a G/E may use a liquefied gas of a gas phase as fuel. A buffer tank 40 may temporarily store a liquefied gas and supply it to a place where it is needed, and may temporarily store a liquefied gas of a gas phase. A buffer tank 40 may withdraw a received liquefied gas separately as a liquid phase and a gas phase.

In addition, a liquefied gas supply line L14 may be branched off from at least one of a liquid transfer line L10 and a spray line L11 to vaporize a liquefied gas of a liquid phase and then transfer it to a liquefied gas supply line L22. A liquefied gas supply line L14 is provided with a forced vaporizer 14 to vaporize a liquefied gas of a liquid phase and deliver it to a liquefied gas supply line L22.

A liquefied gas supply line L22 may receive a liquefied gas of a gas phase from a liquefied gas transfer line and then branches it off to supply it to at least one receiver among a GCU, a G/E, and a buffer tank 40. Specifically, gas temperature and pressure conditions required by a GCU, a G/E, and a buffer tank 40 may be different. A plurality of liquefied gas supply lines L22 may be provided in parallel, and any one liquefied gas supply line L22 may be provided with a low-duty (LD) compressor 17, and the other liquefied gas supply line L22 may be provided with a high-duty (HD) compressor 18. A liquefied gas supply line L22 may supply to a receiver through any one of the above compressors depending on the type of receiver and conditions required thereby.

A liquefied gas supply line L22 may further be provided with a gas-liquid separator 16. A gas-liquid separator 16 separates a liquefied gas received from a liquefied gas transfer line into a gas phase and a liquid phase, and a liquefied gas of only a gas phase may be supplied to at least one of a GCU, a G/E, and a buffer tank 40 through a liquefied gas supply line L22. A liquid phase separated in a gas-liquid separator 16 is a condensate formed by condensing at least a part of a liquefied gas of a gas phase, and may be returned to a bunkering tank 10 through a condensate return line L23. Preferably, a gas-liquid separator 16 may be provided at a front end of an LD compressor 17.

A liquefied gas supply line L22 may further be provided with a heater 19. A heater 19 may further heat a liquefied gas supplied through a liquefied gas supply line L22 and supply it to at least one of a GCU, a G/E, and a buffer tank 40. When a liquefied gas is pressurized in a compressor 17 and 18, its temperature increases, but the increased temperature may be lower than the temperature required by the above-mentioned receivers. A heater 19 may further heat the liquefied gas and adjust it to the temperature level required by a receiver. Preferably, a heater 19 may be provided at a rear end of an HD compressor 18.

For example, with reference to the drawings, a liquefied gas supply line L22 may be provided to be branched off from a gas phase transfer line L20 and then be further branched into a plurality of liquefied gas supply lines L22. Any one liquefied gas supply line L22 may be provided with a gas-liquid separator 16 and an LD compressor 17, and may transfer a liquefied gas of a gas phase to be supplied to at least one of a GCU, a G/E, and a buffer tank 40. At this time, a liquefied gas supply line L14 may join at a front end of the gas-liquid separator 16 to receive the liquefied gas of a gas phase and supply it to the gas-liquid separator 16. The other liquefied gas supply line L22 may be provided with an HD compressor 18 and a heater 19, and may transfer a heated liquefied gas of a gas phase to be supplied to at least one of a GCU, a G/E, and a buffer tank 40.

Figure 12:
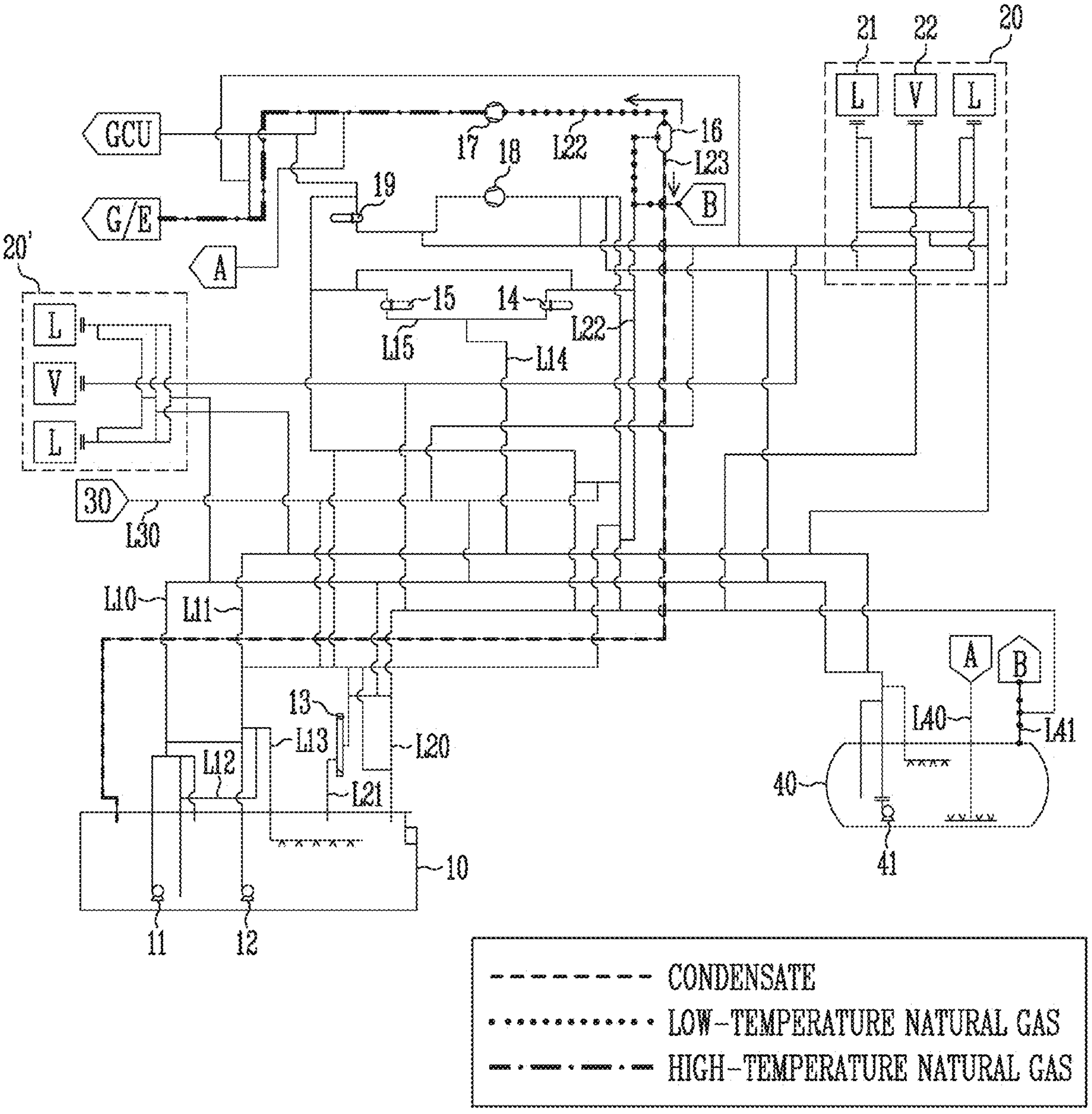
FIG. 12 is a conceptual diagram showing a gas treatment process after bunkering on a bunkering vessel according to an embodiment of the present invention.

FIG. 12 is a conceptual diagram showing a gas-firing process after bunkering on a bunkering vessel according to an embodiment of the present invention. A bunkering vessel may include a bunkering tank 10, a manifold 20, a liquefied gas transfer line, and a buffer tank 40, and the same content as described in FIG. 1 is replaced with the content of the previous embodiment.

A bunkering vessel may process a liquefied gas stored in a buffer tank 40 during a bunkering process for a target. Specifically, a liquefied gas may evaporate even inside a buffer tank 40 to form a BOG.

A bunkering vessel according to the present embodiment may further include a G/E producing power using a liquefied gas as fuel.

A BOG generated inside a buffer tank 40 may be withdrawn through a buffer tank withdrawal line L41 and supplied to a liquefied gas supply line L22. A buffer tank withdrawal line L41 may have one end connected to the top of a buffer tank 40 and the other end connected to a front end of a gas-liquid separator 16 in a liquefied gas supply line L22.

A liquefied gas supplied to a gas-liquid separator 16 may be separated into a gas phase and a liquid phase, and a liquefied gas of a gas phase may be pressurized by an LD compressor 17 through a liquefied gas supply line L22 and supplied to a G/E. The liquid phase may be returned to a bunkering tank 10 as a condensate through a condensate return line L23.

The above gas-firing process has been described as being performed after bunkering on a bunkering vessel, but it is not limited thereto. When a liquefied gas exists inside a buffer tank 40 of a bunkering vessel, a gas-firing process according to the present embodiment may be performed in parallel also in other processes below.

Figure 13:
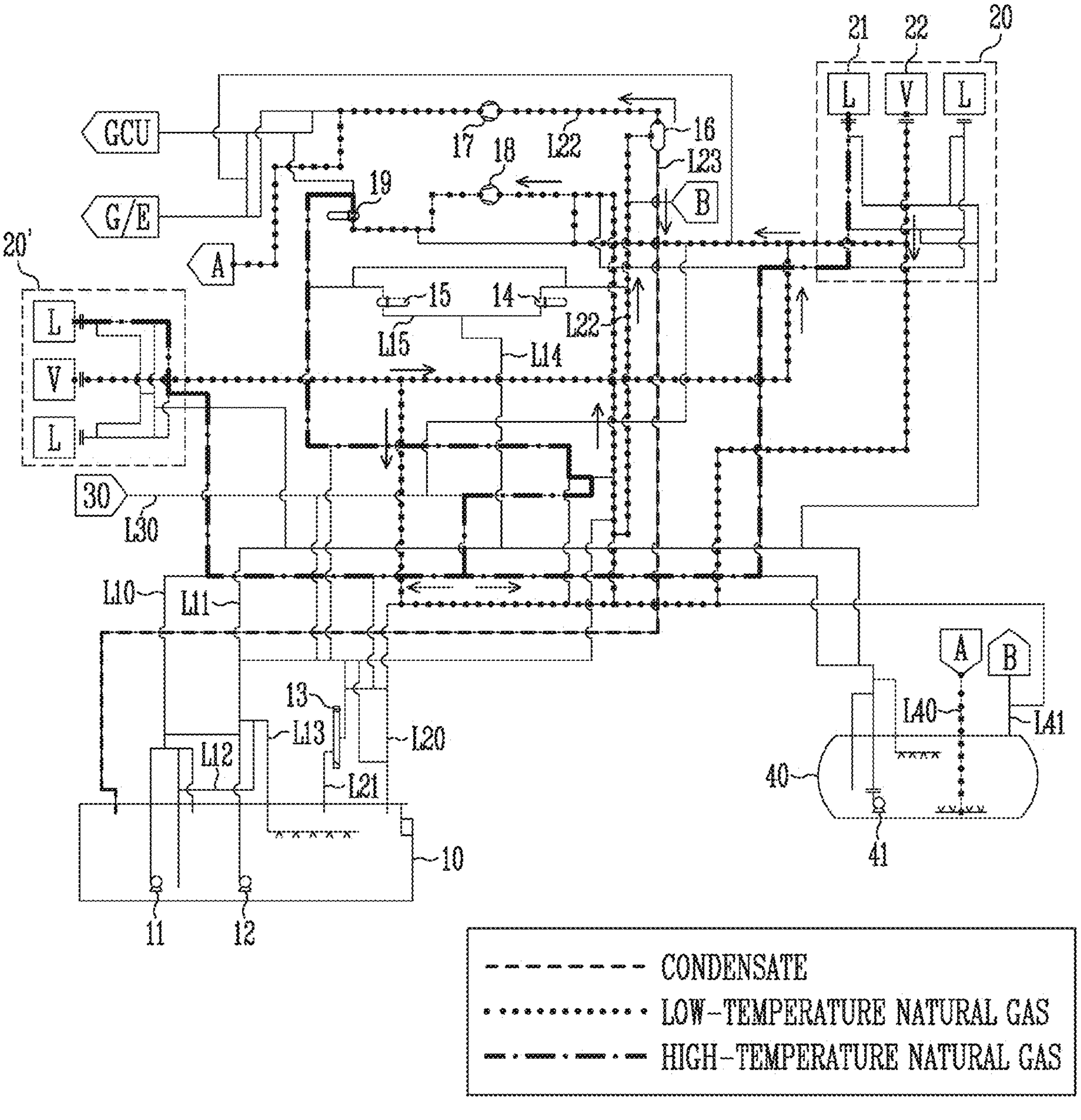
FIG. 13 is a conceptual diagram showing a first warming-up process for supplying a high-temperature liquefied gas to a liquefied gas storage tank of a target on a bunkering vessel according to an embodiment of the present invention.
Figure 14:
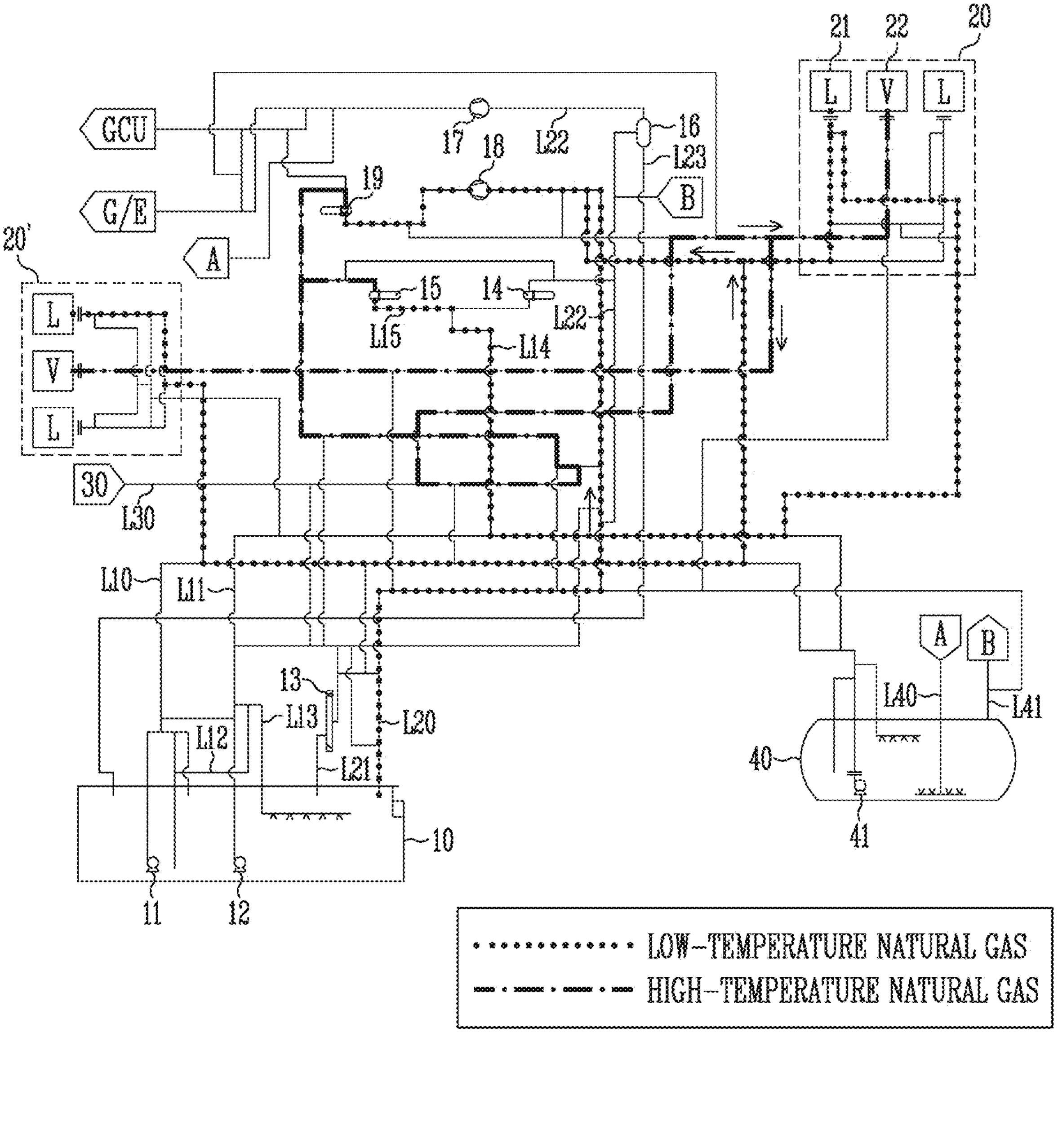
FIG. 14 is a conceptual diagram showing a second warming-up process for supplying a high-temperature liquefied gas to a liquefied gas storage tank of a target on a bunkering vessel according to an embodiment of the present invention.

FIGS. 13 and 14 are conceptual diagrams showing a warming-up process of a liquefied gas storage tank on a bunkering vessel according to an embodiment of the present invention. A bunkering vessel may include a bunkering tank 10, a manifold 20, a liquefied gas transfer line, and a buffer tank 40, and the same content as described in FIG. 1 is replaced with the content of the previous embodiment.

The bunkering vessel according to the present embodiment may unload a liquefied gas from a liquefied gas storage tank of a target, and then supply the liquefied gas to a liquefied gas storage tank and receive a discharge gas discharged from the liquefied gas storage tank while the bunkering vessel is connected to the target.

During a liquefied gas unloading process, sloshing, in which a liquefied gas of a liquid phase sloshes, may occur inside a liquefied gas storage tank due to a flow of the liquefied gas caused by withdrawal of the liquefied gas, and in this process, at least a part of the liquefied gas may evaporate. In addition, as the liquefied gas is withdrawn, the liquefied gas remaining in the liquefied gas storage tank may be further evaporated to form a BOG. A liquefied gas storage tank after loading a liquefied gas may be full of a BOG, that is, a liquefied gas of a gas phase in a low-temperature state. In a warming-up process, to empty the inside of a liquefied gas storage tank, a liquefied gas at a relatively high temperature may be supplied to a liquefied gas storage tank through a manifold 20 and 20', thereby increasing the temperature inside the liquefied gas storage tank.

A bunkering vessel may vaporize a liquefied gas using at least one of a heater 19 and a liquefied gas vaporizer 15 provided on a liquefied gas supply line L22 and supply it to a liquefied gas storage tank.

A bunkering vessel may further heat a BOG supplied through a gas phase transfer line L20 in a heater 19 and inject it back into a liquefied gas storage tank through a liquid phase manifold 21. In addition, a bunkering vessel may heat a liquefied gas supplied through a liquid transfer line L10 in a heater 19 and inject it back into a liquefied gas storage tank through a gas phase manifold 22.

In addition, a bunkering vessel may vaporize a liquefied gas supplied through a liquid manifold 21 or the like in a liquefied gas vaporizer 15 and supply it to a liquefied gas storage tank.

In a warming-up process, a gas phase liquefied gas may be supplied to a liquefied gas storage tank of a target through a liquid phase transfer line L10 or a gas phase transfer line L20 depending on the temperature inside the liquefied gas storage tank of a target. A bunkering vessel may supply a liquefied gas of a gas phase through a liquid phase manifold 21 or a gas phase manifold 22 in consideration of the temperature inside a liquefied gas storage tank.

Referring to FIG. 13, a bunkering vessel may supply a liquefied gas to a liquefied gas storage tank of a target through a liquid phase transfer line L10 immediately after unloading the liquefied gas from the liquefied gas storage tank. Immediately after unloading, the inside of the liquefied gas storage tank is full of a low-temperature liquefied gas, so a liquefied gas at a relatively high temperature is supplied to the bottom of the liquefied gas storage tank through a liquid phase manifold 21 to push a low-temperature liquefied gas to the top of the liquefied gas storage tank. A discharge gas discharged from a liquefied gas storage tank may be supplied to a gas phase transfer line L20 through a gas phase manifold 22.

A gas phase transfer line L20 may receive a liquefied gas, which is a discharge gas discharged from a liquefied gas storage tank, and transfer it to a liquefied gas supply line L22. A liquefied gas may be supplied to a buffer tank 40 through a gas-liquid separator 16 and an LD compressor 17 provided on a liquefied gas supply line L22, or it may be supplied to a heater 19 through an HD compressor 18, heated again, and then injected back into a liquefied gas storage tank through a liquid phase manifold 21.

Referring to FIG. 14, a bunkering vessel may inject a gas phase liquefied gas into a liquefied gas storage tank, and when the internal temperature of the liquefied gas storage tank rises above a predetermined value, a liquefied gas of a gas phase may be supplied to the liquefied gas storage tank through a gas phase transfer line L20. As a liquefied gas of a gas phase at a relatively high temperature is stored in a liquefied gas storage tank, a liquefied gas of a gas phase may be supplied to the top of the liquefied gas through a gas phase manifold 22, thereby pushing a remaining low-temperature liquefied gas to the bottom of the liquefied gas. A discharge gas discharged from a liquefied gas storage tank may be supplied to a liquid phase transfer line L10 through a liquid phase manifold.

A liquid phase transfer line L10 may receive a liquefied gas, which is a discharge gas discharged from a liquefied gas storage tank, and transfer it to a liquefied gas supply line L22. A liquefied gas may be supplied to a heater 19 through an HD compressor 18 provided on a liquefied gas supply line, heated again, and then injected back into a liquefied gas storage tank through a gas phase manifold 22. At this time, a liquefied gas may be supplied from a bunkering tank 10 and supplied together to the heater 19 through an HD compressor 18 to be used.

A bunkering vessel may supply a liquefied gas until the temperature inside liquefied gas rises above −10° C.

In a warming-up process according to the present embodiment, a target may be a liquefied gas carrier or a liquefied gas propulsion ship, and a liquefied gas storage tank may be a pressure container, but it is not limited thereto.

A bunkering vessel according to the present embodiment may protect a liquefied gas storage tank and facilities provided therein by increasing the temperature inside the liquefied gas storage tank after unloading even when an inert gas is subsequently injected. At this time, a liquefied gas discharged from the liquefied gas storage tank is reheated and injected as a liquefied gas, so that the warming-up process may be performed by utilizing the flow rate of the liquefied gas flow rate inside the liquefied gas storage tank as much as possible.

Figure 15:
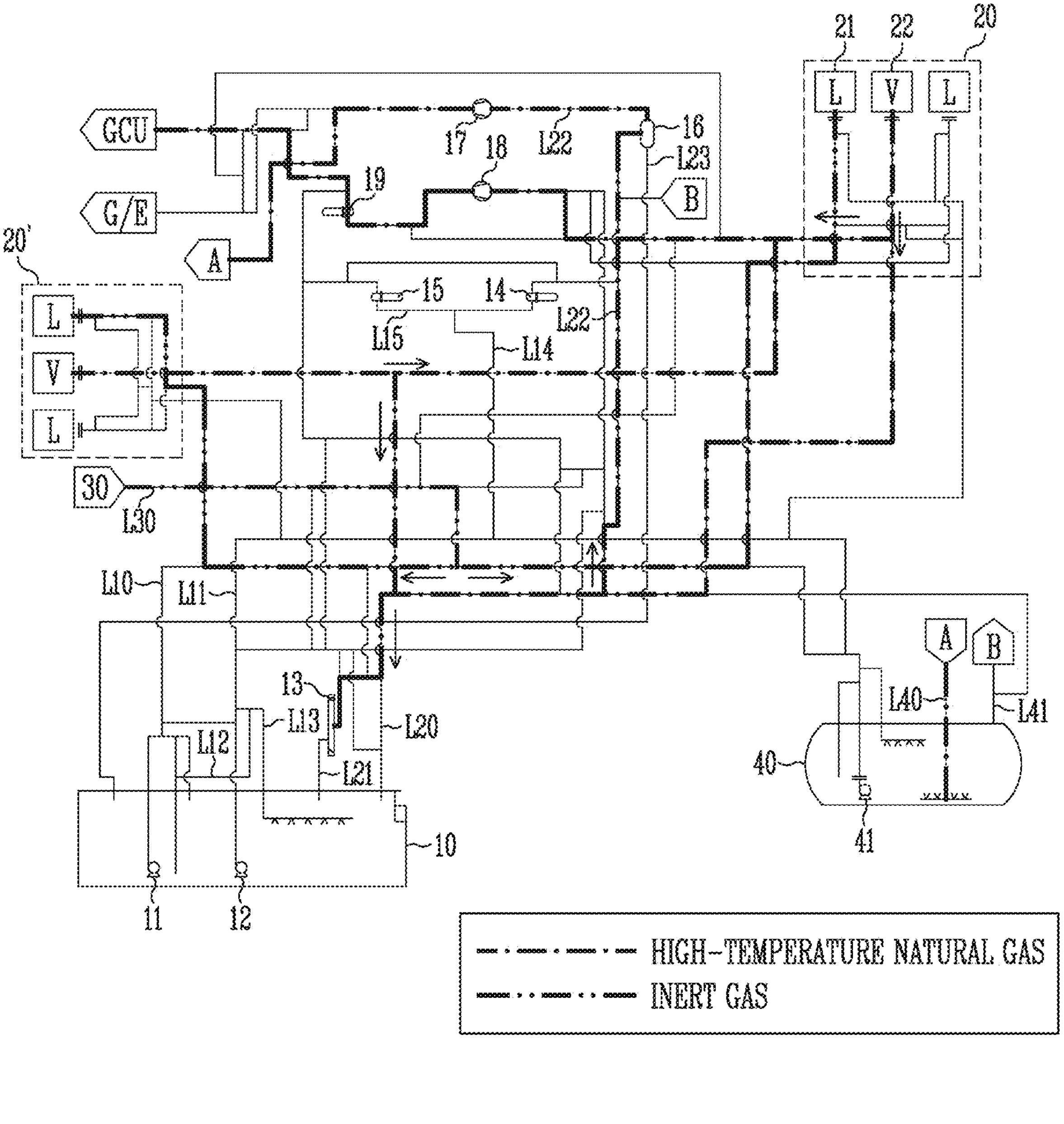
FIG. 15 is a conceptual diagram showing a gas-freeing process for treating a discharge gas received from a liquefied gas storage tank of a target on a bunkering vessel according to an embodiment of the present invention.

FIG. 15 is a conceptual diagram showing a gas-freeing process of a liquefied gas storage tank on a bunkering vessel according to an embodiment of the present invention. A bunkering vessel may include a bunkering tank 10, a manifold 20, a liquefied gas transfer line, a gas supply portion 30, and a buffer tank 40, and the same content as described in FIG. 1 is replaced with the content of the previous embodiment.

A gas-freeing process is similar to an inerting process in that it supplies an inert gas to a liquefied gas storage tank. However, a gas-freeing process is performed after unloading a liquefied gas from a liquefied gas storage tank of a target and increasing the internal temperature of the liquefied gas storage tank through a warming-up process. A gas-freeing process may be to remove a liquefied gas inside a liquefied gas storage tank by supplying an inert gas to the liquefied gas storage tank through a manifold 20 and 20' after a warming-up process.

A liquefied gas storage tank that has gone through a warming-up process may be full of a liquefied gas of a gas phase at a relatively high temperature. Through a gas-freeing process, a liquefied gas in a liquefied gas storage tank may be withdrawn and recovered for use or treatment, and an explosive gas in the liquefied gas storage tank may be removed by supplying an inert gas into the liquefied gas storage tank. Hereinafter, an explosive gas may be a liquefied gas.

A gas supply portion 30 may be an inert gas supply portion, and an inert gas may be nitrogen gas or a gas generated by combusting heavy oil. An inert gas supply portion may be at least one of an inert gas generator that generates nitrogen gas and a combustion device that is capable of combusting heavy oil. An inert gas may be the same as that used in the inerting process described above. In other words, an inert gas may have an oxygen concentration of 5% (v/v) or less, preferably an oxygen concentration of 2% (v/v) or less, and most preferably an oxygen concentration of 1% (v/v) or less.

An inert gas supply portion may produce an inert gas and supply the inert gas to a liquefied gas storage tank through a gas supply line L30. A gas supply line L30 may supply an inert gas to a manifold 20 and 20' through a liquid transfer line L10. An inert gas may be supplied to the bottom of a liquefied gas storage tank through a liquid manifold 21. An inert gas may be relatively heavier than a liquefied gas, and may be supplied to the bottom of a liquefied gas storage tank to push a liquefied gas inside the liquefied gas storage tank to the top of the liquefied gas storage tank.

A bunkering vessel may receive and treat a discharge gas discharged by injecting an inert gas into a liquefied gas storage tank. A discharge gas may be a liquefied gas of a gas phase and may be supplied to a gas phase transfer line L20 through a gas phase manifold 22.

A bunkering vessel may process a liquefied gas supplied from a liquefied gas storage tank by supplying it to at least one of a GCU, a vent portion 13, and a buffer tank 40. A liquefied gas may be supplied to at least one of a GCU and a buffer tank 40 by passing through a liquefied gas supply line L22 through a gas phase transfer line L20, and may be supplied to a vent portion 13 through the gas phase transfer line L20. For example, in an early stage of a gas-freeing process, a discharge gas received from a liquefied gas storage tank of a target may contain approximately 90% (v/v) of a liquefied gas, and in this case, the liquefied gas may be supplied to a buffer tank 40 through an LD compressor 17. When a liquefied gas content in a discharge gas decreases, a discharge gas may be supplied to a GCU through an HD compressor 18. Finally, when most of a discharge gas is an inert gas such as nitrogen gas, a discharge gas may be discharged by supplying it to a vent portion 13.

An inert gas supply portion may supply an inert gas until a liquefied gas concentration inside a liquefied gas storage tank is lowered below 2% (v/v). When a liquefied gas concentration inside a liquefied gas storage tank is lowered below 2% (v/v), the risk of explosion within the liquefied gas storage tank is significantly lowered.

In a BOG treatment process according to the present embodiment, a target may be a liquefied gas carrier or a liquefied gas propulsion ship, and a liquefied gas storage tank may be a pressure container, but it is not limited thereto. When a gas-freeing process is performed for a liquefied gas carrier, a discharge gas may be treated on the liquefied gas carrier, or may be supplied to a bunkering vessel to be treated.

A bunkering vessel according to the present embodiment may remove a liquefied gas inside a liquefied gas storage tank of a target using an inert gas generated inside the bunkering vessel, and the liquefied gas may be recovered to the bunkering vessel to be treated or reused.

Figure 16:
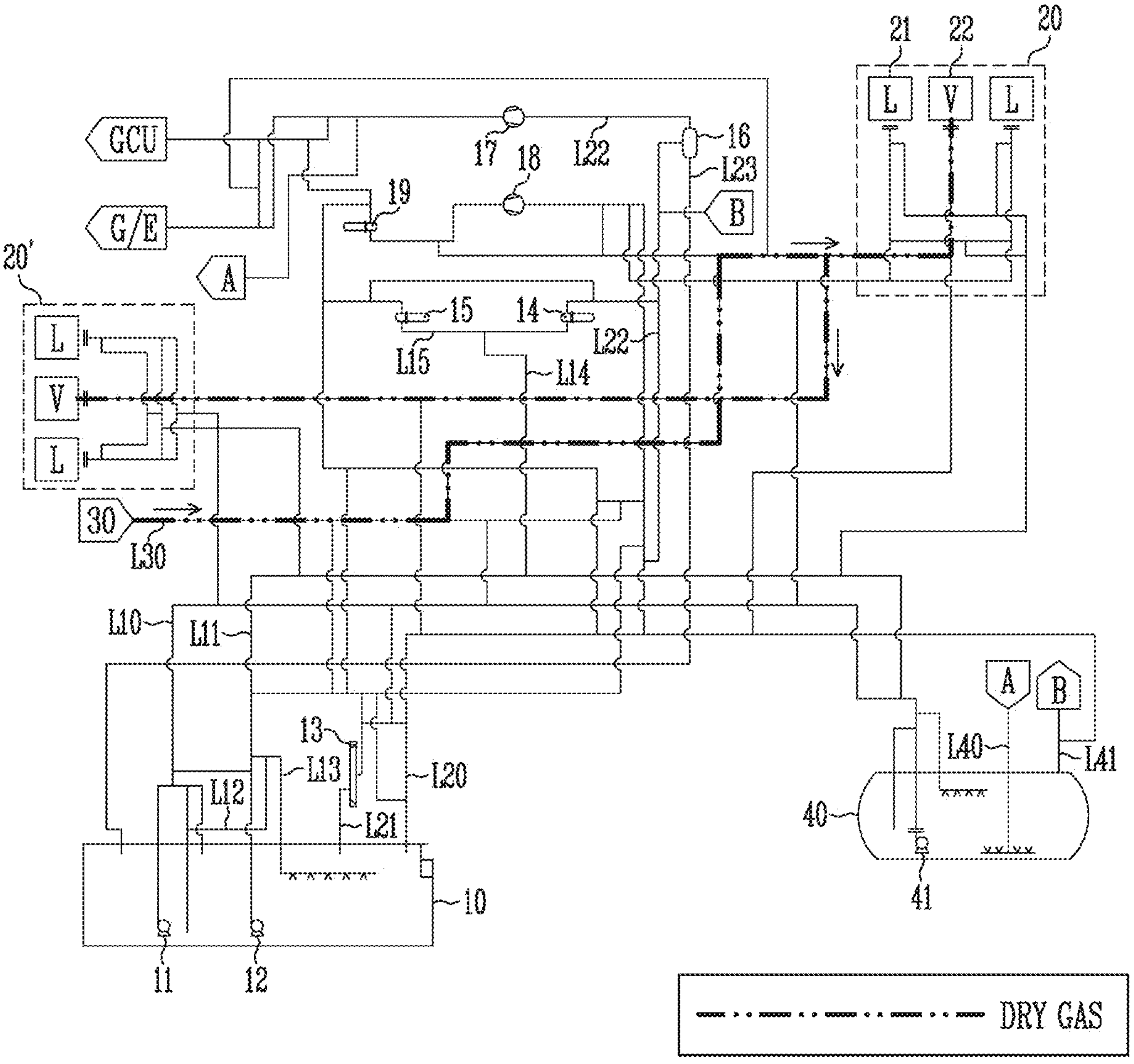
FIG. 16 is a conceptual diagram showing an aeration process for supplying a dry gas on a bunkering vessel according to an embodiment of the present invention.
Figure 17:
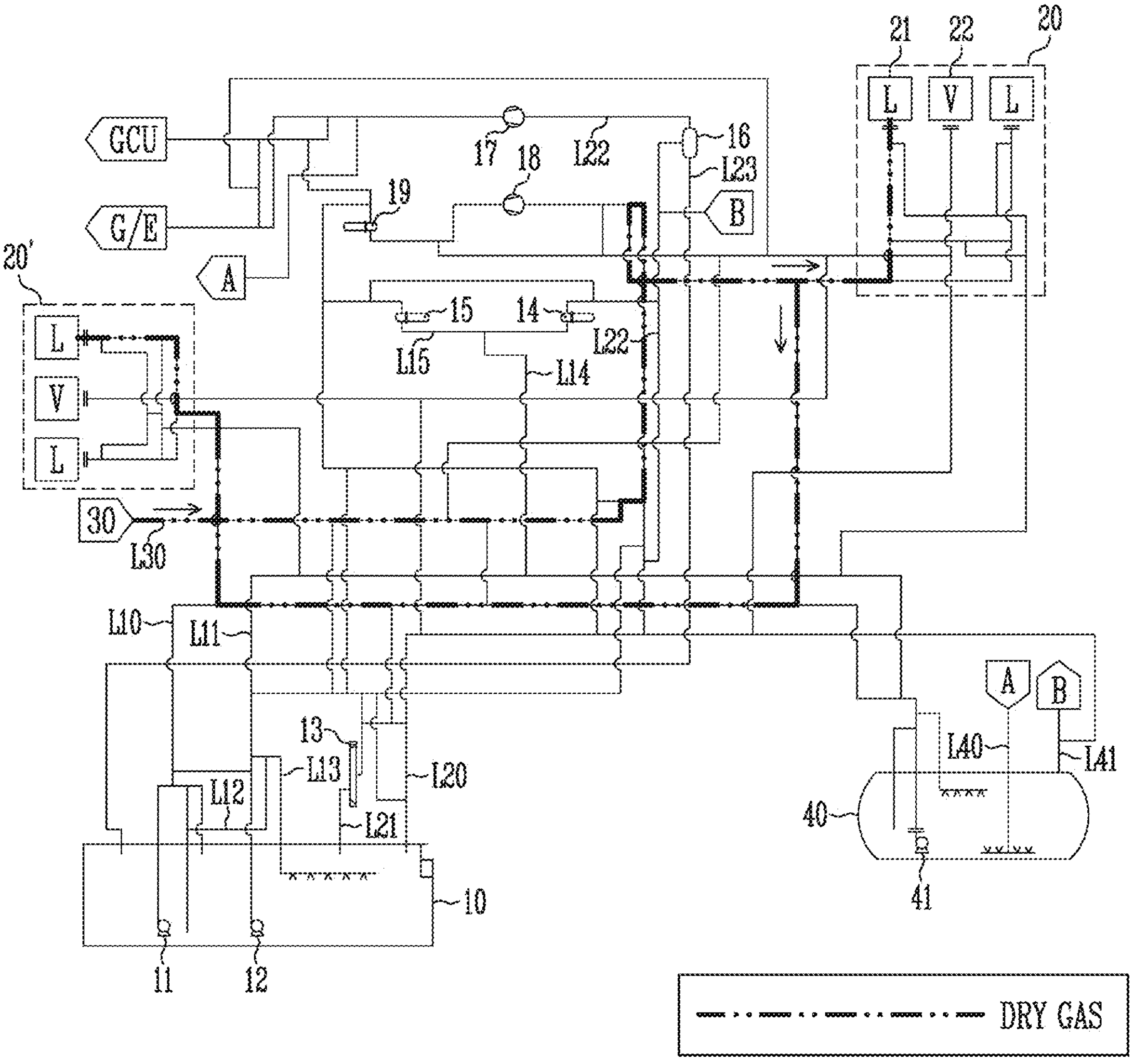
FIG. 17 is a conceptual diagram showing an aeration process for supplying a dry gas on a bunkering vessel according to an embodiment of the present invention.

FIGS. 16 and 17 are conceptual diagrams showing an aerating process of a liquefied gas storage tank of a target on a bunkering vessel according to an embodiment of the present invention. A bunkering vessel may include a bunkering tank 10, a manifold 20, a liquefied gas transfer line, a gas supply portion 30, and a buffer tank 40, and the same content as described in FIG. 1 is replaced with the content of the previous embodiment.

An aerating process is similar to a drying process in that it supplies a dry gas to a liquefied gas storage tank. However, an aerating process is performed after unloading a liquefied gas from a liquefied gas storage tank of a target and filling the liquefied gas storage tank with an inert gas through gas freeing. An aerating process may be to remove an inert gas inside a liquefied gas storage tank by supplying a dry gas to a liquefied gas storage tank through a manifold 20 and 20' after a gas-freeing process.

A liquefied gas storage tank that has completed a gas-freeing process may be full of an inert gas. A liquefied gas storage tank may be kept full of an inert gas and then sequentially go through from a gassing-up process for loading a liquefied gas again. An aerating process may be performed when a person must enter the inside of a liquefied gas storage tank for maintenance and repair of the inside of the liquefied gas storage tank, that is, to create an environment in which a person may breathe. Therefore, aerating may be a process of adjusting an oxygen concentration inside a liquefied gas storage tank to approximately 20% (v/v).

A gas supply portion 30 may be a dry gas supply portion, and a dry gas may be air containing oxygen, as a dry air containing no moisture. A dry gas supply portion may produce a dry gas using power produced by a G/E of a bunkering vessel.

A dry gas supply portion may produce a dry gas and supply the dry gas to a liquefied gas storage tank through a gas supply line L30. A gas supply line L30 may supply a dry gas to a manifold 20 and 20' through at least one of a liquid phase transfer line L10 and a gas phase transfer line L20.

At this time, a gas supply line L30 may supply a dry gas through a liquid transfer line L10 or a gas phase transfer line L20, depending on the type of inert gas used in a gas-freeing process and filling the inside of a liquefied gas storage tank.

Referring to FIG. 16, a gas supply line L30 may supply a dry gas through a gas phase transfer line L20 when a liquefied gas storage tank is filled with an inert gas generated by combusting heavy oil. A gas supply line L30 may supply a dry gas to the top of a liquefied gas storage tank by passing through a gas phase manifold 22 through a gas phase transfer line L20. A dry gas may have a lighter weight than an inert gas formed by combustion, and may be supplied to the top of a liquefied gas storage tank and move down to the bottom of the liquefied gas storage tank to push the inert gas inside the liquefied gas storage tank to the bottom of the liquefied gas storage tank.

Referring to FIG. 17, a gas supply line L30 may supply a dry gas through a liquid phase transfer line L10 when the inside of a liquefied gas storage tank is filled with an inert gas such as nitrogen gas. A gas supply line L30 may supply a dry gas to the bottom of a liquefied gas storage tank by passing through a liquid manifold 21 through a liquid transfer line L10. A dry gas may have a heavier weight than nitrogen gas at a relatively low temperature, and may push an inert gas to the top of a liquefied gas storage tank.

Regardless of a dry gas supply method, a dry gas supply portion may supply a dry gas until the oxygen concentration inside a liquefied gas storage tank reaches 20% (v/v) or higher.

Most of a discharge gas discharged when a dry gas is injected into a liquefied gas storage tank is an inert gas, and since the discharge gas has a very low content of liquefied gas or contains almost no liquefied gas, it may be treated by discharging it from a target as it is.

In an aerating process according to the present embodiment, a target may be a liquefied gas carrier or a liquefied gas propulsion ship, and a liquefied gas storage tank may be a pressure container, but it is not limited thereto.

A bunkering vessel according to the present embodiment may supply a dry gas to provide an environment in which a person may work inside a liquefied gas storage tank when maintenance and repairs are required inside the liquefied gas storage tank after unloading the liquefied gas storage tank.

The present invention is not limited to the embodiments described above, and of course may include a combination of the above embodiments or a combination of at least one of the above embodiments with known arts as another embodiment.

In the above, the present invention has been described focusing on the embodiments of the present invention, but this is only an example and does not limit the present invention, and those of ordinary skill in the field to which the present invention pertains will understand that various combinations or modifications and applications that are not illustrated in the embodiments are possible without departing from the essential technical details of the present embodiments. Therefore, technical details related to modifications and applications that can be easily derived from the embodiments of the present invention should be construed as being included in the present invention.

[Reference Numerals]

| | |
|---|---|
| 10: bunkering tank | 11: first pump |
| 12: second pump | 13: vent portion |
| 14: forced vaporizer | 15: liquefied gas vaporizer |
| 16: gas-liquid separator | 17: LD compressor |
| 18: HD compressor | 19: heater |
| 20 and 20': manifold | 21: liquid phase manifold |
| 22: gas phase manifold | 30: gas supply portion |
| 40: buffer tank | 41: pump |
| L10: liquid phase transfer line | L11: spray line |
| L12: liquefied gas return line | L13: spray return line |
| L14: liquefied gas supply line | L15: liquefied gas vaporization line |
| L20: gas phase transfer line | L21: vent line |
| L22: liquefied gas supply line | L23: condensate return line |
| L30: gas supply line | L40: buffer tank supply line |
| L41: buffer tank withdrawal line | |

What is claimed is:

1. A bunkering vessel for loading a liquefied gas to or unloading a liquefied gas from a liquefied gas storage tank of a target, comprising:
   - a bunkering tank storing a liquefied gas;
   - a manifold provided at a bunkering station of the bunkering vessel to flow in a liquefied gas to and flow out a liquefied gas from the bunkering vessel;
   - a liquefied gas transfer line connecting the bunkering tank and the manifold to flow a liquefied gas; and
   - a dry gas supply portion producing a dry gas,
   - wherein, the bunkering vessel supplies the dry gas to the liquefied gas storage tank through the manifold,
   - wherein, before loading a liquefied gas to the liquefied gas storage tank, the bunkering vessel supplies the dry gas to the liquefied gas storage tank through the manifold to remove moisture inside the liquefied gas storage tank,
   - wherein the liquefied gas transfer line includes:
   - a liquid phase transfer line transferring a liquefied gas of a liquid phase; and
   - a gas phase transfer line transferring a liquefied gas of a gas phase, and
   - wherein the bunkering vessel further comprises a gas supply line delivering the dry gas received from the dry gas supply portion to at least one of the liquid phase transfer line and the gas phase transfer line, and
   - wherein the gas supply line supplies the dry gas through the liquid phase transfer line when an external temperature of the bunkering vessel is higher than or equal to a predetermined temperature, and supplies the dry gas through the gas phase transfer line when an external temperature of the bunkering vessel is lower than the predetermined temperature.

2. A bunkering vessel for loading a liquefied gas to or unloading a liquefied gas from a liquefied gas storage tank of a target, comprising:
   - a bunkering tank storing a liquefied gas;
   - a manifold provided at a bunkering station of the bunkering vessel to flow in a liquefied gas to and flow out a liquefied gas from the bunkering vessel;
   - a liquefied gas transfer line connecting the bunkering tank and the manifold to flow a liquefied gas; and
   - a dry gas supply portion producing a dry gas,
   - wherein, the bunkering vessel supplies the dry gas to the liquefied gas storage tank through the manifold,
   - wherein, before loading a liquefied gas to the liquefied gas storage tank, the bunkering vessel supplies the dry gas to the liquefied gas storage tank through the manifold to remove moisture inside the liquefied gas storage tank, wherein the liquefied gas transfer line includes:

a liquid phase transfer line transferring a liquefied gas of a liquid phase; and a gas phase transfer line transferring a liquefied gas of a gas phase, wherein the bunkering vessel further comprises a gas supply line delivering the dry gas received from the dry gas supply portion to at least one of the liquid phase transfer line and the gas phase transfer line, and wherein the gas supply line supplies a dry gas through the liquid phase transfer line when an internal temperature of the liquefied gas storage tank is higher than or equal to a predetermined temperature, and supplies the dry gas through the gas phase transfer line when an internal temperature of the liquefied gas storage tank is lower than a predetermined temperature.

3. A bunkering vessel for loading a liquefied gas to or unloading a liquefied gas from a liquefied gas storage tank of a target, comprising:

a bunkering tank storing a liquefied gas;

a manifold provided at a bunkering station of the bunkering vessel to flow in the liquefied gas to and flow out the liquefied gas from the bunkering vessel;

a liquefied gas transfer line connecting the bunkering tank and the manifold to flow the liquefied gas; and a dry gas supply portion producing a dry gas, wherein, the bunkering vessel supplies the dry gas to the liquefied gas storage tank through the manifold, wherein after unloading a liquefied gas from the liquefied gas storage tank, the dry gas supply portion supplies the dry gas to the liquefied gas storage tank through the manifold to discharge an inert gas from the liquefied gas storage tank, wherein the liquefied gas transfer line includes:

a liquid phase transfer line transferring a liquefied gas of a liquid phase; and a gas phase transfer line transferring a liquefied gas of a gas phase, wherein the bunkering vessel further comprising a gas supply line delivering the dry gas received from the dry gas supply portion to at least one of the liquid phase transfer line and the gas phase transfer line, and wherein the bunkering vessel supplies the dry gas through the liquid phase transfer line when the inert gas is nitrogen gas, and supplies the dry gas through the gas phase transfer line when the inert gas is a gas generated by combusting heavy oil.

* * * * *